United States Patent [19]

Tang et al.

[11] Patent Number: 5,717,298

[45] Date of Patent: Feb. 10, 1998

[54] BRUSHLESS DC MOTOR START CIRCUIT THAT SUPPRESSES FIELD EXCITATION DURING ALTERNATE POLYPHASE COMMUTATION STATES WHEN STARTING

[75] Inventors: Shi-Ming Tang; Sang-Yong Lee, both of Kyungki-do, Rep. of Korea

[73] Assignee: Samsung Electronics Co., Ltd., Suwon, Rep. of Korea

[21] Appl. No.: 652,176

[22] Filed: May 23, 1996

[30] Foreign Application Priority Data

Nov. 28, 1995 [KR] Rep. of Korea ............... 95-44291

[51] Int. Cl.[6] .................................................. H02P 6/20
[52] U.S. Cl. .................................. 318/254; 318/431
[58] Field of Search .............................. 318/138, 254, 318/430, 431, 439, 720, 721, 724

[56] References Cited

U.S. PATENT DOCUMENTS

| | | | |
|---|---|---|---|
| 4,641,066 | 2/1987 | Nagata et al. | 318/254 |
| 4,876,491 | 10/1989 | Squires et al. | 318/138 |
| 4,912,378 | 3/1990 | Vukosavic | 318/254 |
| 5,068,582 | 11/1991 | Scott | 318/254 |
| 5,130,620 | 7/1992 | Inaji et al. | 318/254 |
| 5,144,209 | 9/1992 | Ingji et al. | 318/254 |
| 5,254,914 | 10/1993 | Dunfield et al. | 318/254 |
| 5,323,094 | 6/1994 | Kaneda et al. | 318/254 |

Primary Examiner—Bentsu Ro
Attorney, Agent, or Firm—Allen LeRoy Limberg

[57] ABSTRACT

During start-up a telegraph-start circuit for a DC motor withholds exciting current from the stator field coils during alternative ones of the polyphase commutation signals used when the motor is running. This produces a high starting torque at an initial time overcoming dead-point, head-sticking and insufficient-initial-starting-torque problems in motor drive applications, while avoiding rail-to-rail short-through problems in the driver circuitry. Commutation-stop and power-OFF time control lowers dissipation required of field coil driver circuitry by periodically interrupting starting current flow into the DC motor field coils. The telegraph-start circuit includes an adjustable-rate clock generator, a commutation-stop and power-OFF time controller, a ring counter, a dual-mode commutation circuit, field coil driver circuitry, a zero-crossing reference generator, a phase selector, a zero-crossing detector, and a condition-of-rotation detector.

24 Claims, 12 Drawing Sheets

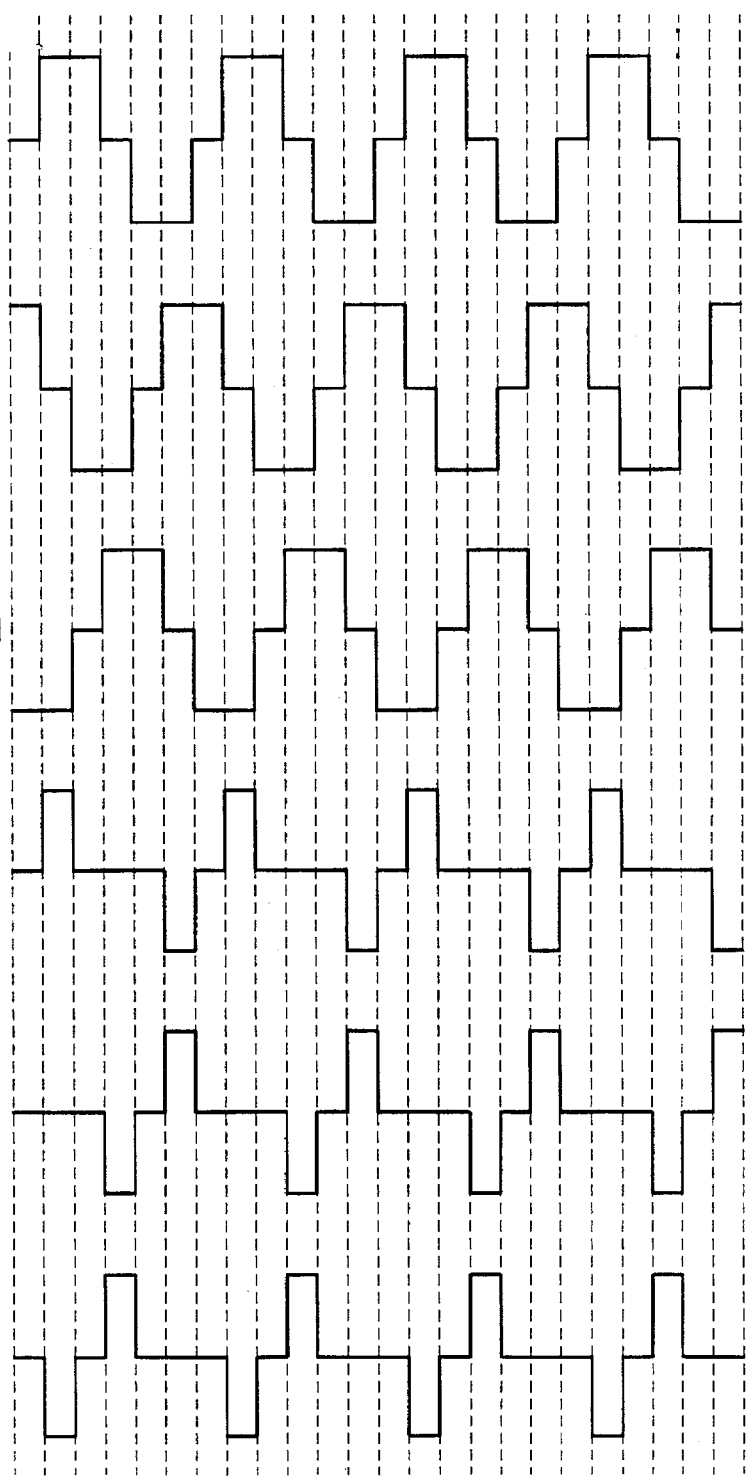

clock1 q1 q2 q3 q4 q5 q6

FIG.5H  dq1  0
FIG.5I  dq3  0
FIG.5J  dq5  1
FIG.5K  dq2  0
FIG.5L  dq4  1
FIG.5M  dq6  0
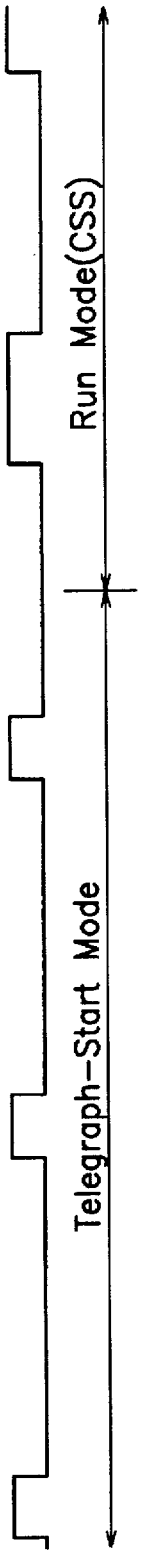
Run Mode(CSS)
Telegraph-Start Mode

BRUSHLESS DC MOTOR START CIRCUIT THAT SUPPRESSES FIELD EXCITATION DURING ALTERNATE POLYPHASE COMMUTATION STATES WHEN STARTING

FIELD OF THE INVENTION

The invention relates to start circuits for sensorless brushless DC motors and more particularly, to start circuits of a new type referred to as "telegraph start circuits" because they emit a chattering sound during start-up that resembles the noise made by a telegraph sounder.

BACKGROUND OF THE INVENTION

The spindle drive motor of a magnetic-disk drive apparatus is generally a brushless polyphase DC motor, which motor comprises a permanently magnetized rotor and a stator provided with polyphase windings. The polyphase windings are sequentially energized by direct current pulses for creating a rotating magnetic flux pattern inducing torque on the permanently magnetized rotor. The direct current pulses are supplied from motor driver circuitry in response to commutation signals supplied by control circuitry which commonly is constructed using monolithic integrated circuitry. Some brushless polyphase DC motors include sensors for detecting the positioning of their rotors, so that suitable commutation signals can be generated, especially during motor start-up. Optical sensors and Hall-device sensors have been used for detecting the positioning of the rotor. Other brushless polyphase DC motors are "sensorless", in that they do not use optical or Hall-device sensors to determine rotor position, but rely instead on sensing electrical conditions in the stator windings to determine rotor position. Brushless, sensorless DC motors of three-phase type are particularly common.

Usually motors of this type can be thought of as having a stator with three field coils, generally connected in a wye configuration, although in practice a larger number of stator field coils are usually employed with multiple motor poles. Typically, eight pole motors are used which have four electrical cycles per revolution of the rotor. However, the stator coils can still be analyzed in terms of three field coils connected in wye configuration, each comprising a respective set of four coils physically separated by 90° around the circumference of the stator.

In bipolar operation the three field coils are switched so that each conducts direct current flow in opposite directions at different times to cyclically produce forward-magnetizing, non-magnetizing and reverse-magnetizing conditions. In bipolar operation the field coils are energized in sequences in each of which a current is driven through two of the three field coils in the wye, with the third coil being left undriven. The sequences are arranged such that as the current paths through the field coils are changed, or commutated, a successive one of the coils is switched out of the current path and is undriven, and the previously undriven coil is switched back into the current path. Furthermore, the sequence is defined such that when the previously undriven coil is switched back into the current path, current will flow in the same direction as in the now undriven coil which was previously included in the current path, so field rotation (and consequently rotor rotation) will continue in the same direction. Accordingly, six consecutive commutation states are established for each electrical cycle in a DC motor with three-phase stator field coils.

In the conventional step sequence (CSS) for bipolar operation the step sequence is such that, in each of the stator coils, the duration of the application of a specified direct current in a forward direction to produce forward magnetization is the same in each cycle as the duration of the application of the specified direct current in a reverse direction to produce reverse magnetization. The CSS causes the direction of the application of the specified direct current to each stator coil to alternate, with the intervals of the application of the specified direct current being separated by intervals half as long in duration, during which the stator coil is undriven and conducts no current to produce a non-magnetizing condition. The CSS is generated using a ring counter configuration of six data flip-flops in which patterns of logic ONEs are circulated.

Maintaining information concerning the position of the rotor is important to generating the commutation sequences so that the motor rotation can be maintained without jerkiness. The most widely used way of doing this is to start the motor from a known position, then develop information related to the instantaneous or current position of the rotor. Instantaneous position information can be obtained as part of the commutation process, by identifying the currently undriven stator field coil and monitoring the back electromotive force, or "back EMF", induced in the currently undriven coil responsive to changes in the rotating magnetic field generated by the other stator field coils and modified by the changes in magnetic transformer coupling afforded by changing position of the rotor. When the voltage induced in the undriven coil reverses polarity, which is referred to as a "zero-crossing", the position of the rotor is assumed to be known. The detection of the zero-crossing is commonly used for controlling the frequency and phasing of the commutation sequence for the stator field coils. The "back EMF" can be easily detected for determining suitable commutation signals after the motor is running, but is too small to be readily and reliably detected during motor start-up. At the beginning of motor start-up, differences in the inductances of the phases of the polyphase stator winding owing to rotor positioning can be measured by determining the responses to applied current pulses, thus to develop an indication of rotor positioning.

Start failure or start reliability of a sensorless brushless polyphase DC motor drive is an important issue in the HDD industry. Conventionally, in sensorless brushless polyphase DC motor drive applications, the principal difficulties encountered when starting a motor are lack of information about the position of its rotor, substantial starting torque requirement, and low starting torque owing to the rotor being at or near a deadpoint where torque is zero. Starting torque requirements are generally higher than running torque requirements in order to overcome "stiction". Stiction in a Winchester drive arises in part because of head sticking or drag on the magnetic disk before the cushion of air the heads "fly" on is established by the spinning of the magnetic disk, and in part because static friction in the hard-disk-drive bearings is greater than dynamic friction. Starting torque requirements are particularly high if because of humidity or other condition there is substantial head sticking. Many motor starting methods have been suggested to overcome these well-known difficulties.

An example of a technique for overcoming the disadvantage that the motor will not start owing to lack of information about the position of the rotor is described in U.S. Pat. No. 5,254,914 issued Oct. 19, 1993, to John C. Dunfield et alii and entitled POSITION DETECTOR FOR BRUSHLESS DC MOTOR. U.S. Pat. No. 5,254,914 describes determining the rotor position at start by injecting short current pulses in each of the polyphase stator windings, each phase or pair of phases being energized first by a pulse of one polarity and then by a pulse of opposite polarity. The difference of the decay times of the induced voltages in the unenergized phases is detected. A table of results established by such testing is indicative of the position of the rotor relative to the stator windings, defining what polarity currents should be applied to each phase to start the motor so that rotor rotation begins in a prescribed direction. The starting procedure disclosed by Dunfield in U.S. Pat. No. 5,254,914 indirectly measures mutual inductance between stator field coil winding phases, so is useful only in sensorless brushless polyphase DC motors having significant mutual inductance between stator field coil winding phases. High starting torque is not guaranteed because, if the initial starting torque of the motor is insufficient, subsequent motor synchronization is problematic. Undesirable hunting for synchronization of the motor with possible cogging or reverse rotation tends to result.

A technique of using high-frequency commutation, in which a short current pulse is applied to each phase of the stator winding and motor current responses thereto are measured to monitor the position of the rotor throughout a motor starting period, is described in U.S. Pat. No. 4,876,491 issued Oct. 24, 1989, to John P. Squires et alii and entitled COMMUTATORLESS DC MOTOR FOR HARD DISC SYSTEM. The rotor position is indicated by the stator winding phase having the highest motor current response. High starting torque cannot be guaranteed since, if the initial starting torque of the motor is insufficient, motor synchronization will be lost and undesirable hunting for synchronization of the motor follows with loss of starting torque because of cogging or reverse rotation as the motor slips back in phase.

Squires et alii describe the high-frequency commutation being applied to the motor until it reaches a prescribed speed, less than the final running speed, but sufficiently high that the stator windings have substantial counter-EMFs induced therein. However, undesirable hunting for synchronization of the motor with possible cogging or reverse rotation tends to result from continuing to apply the high-frequency commutation as rotor speed builds up during a later portion of the motor starting period. This problem arises because the build-up of counter-EMF as rotor speed increases affects the magnitudes of the motor currents, leading to error in determining which motor current is the largest.

After motor rotation reaches speeds at which appreciable counter-EMFs are induced in the stator windings and motor currents are reduced, it is preferable to detect zero-crossings in the back EMFs of the undriven stator field coils, rather than peaks in motor currents, in order to establish the timing reference for generating commutation. The spacing of zero-crossings provides a valid timing reference for generating commutation at these speeds, unaffected by the amplitudes of motor currents diminishing as counter-EMFs build-up in the stator windings with increasing speed of rotation.

High starting torque still cannot be guaranteed, however, even if the conventional step sequence is applied to the stator field coils of the motor in correct phasing. Commutation based on this timing reference may produce insufficiently large initial starting torque. High starting torque cannot be produced if the initial starting torque of the motor is insufficient, and the rotor will slowly and abnormally rotate, even though the zero-crossovers are accurately detected. Accordingly, it is important to produce high starting torque.

U.S. Pat. No. 5,323,094 issued Jun. 21, 1994, to Kaneda et alii and entitled METHOD OF STARTING A SENSORLESS MULTIPHASE DC MOTOR describes commutation sequences that provide high starting torque in a three-phase brushless, sensorless DC motor. Kaneda et alii describe a commutation sequence for start up that is of double-drive type in which each stator field coil has the direction of current flow therethrough alternated with certain alterations of polarity taking place without intervening intervals of zero current flow, to double the magnetic flux density variation generated by that field coil at those times. Those times coincide with times doubled magnetic flux density variation is generated by one or the other of the other field coils. The doubling of these magnetic flux density variations boosts starting torque. This commutation sequence can be subsequently repeated, reversing the polarity with each repetition to reduce magnetic saturation owing to average field coil currents having direct components. The commutation sequence can be repeated, increasing the magnitude of current drive with each repetition.

There is still the problem that the rotor may be located at a dead point in its rotation when starting is attempted. To solve this problem Kaneda modify their first commutation sequence to connect the coil that would otherwise float to conduct current for a time extending through the time doubled magnetic flux density variation would otherwise be generated by that coil. The dead point is shifted slightly depending on whether the modified connection is applied or discontinued. Starting is thus assured. If the rotor is not on shifted dead point at the beginning of start, its initial rotational torque will carry it past the dead point when the modified connection is discontinued. If the rotor is on shifted dead point at the beginning of start, a shift back in dead point by discontinuing the modified connection after an initial failure to start will cause the rotor no longer to be at a dead point, and rotation of the rotor will commence, at least when the doubled magnetic flux density variation next occurs.

However, even though higher starting torque can be obtained by the methods Kaneda et alii describe, their methods have the disadvantage that during the starting period the rotation of the rotor is not synchronized with the rotating magnetic flux pattern generated by the stator windings when the conventional step sequence is switched to during the running mode of operation. So, undesirable hunting for synchronization of the motor with possible cogging or reverse rotation can occur during switchover to the conventional step sequence. Practically speaking, the higher torque of the Kaneda et alii method is unavailable during this hunting period because changes in torque in opposing directions tend to cancel.

The Kaneda et alii method is not only a double-drive method, which is to say a method where opposing magnetic flux change is induced in two windings at a time, but also switches the direction of excitation current in each of these windings from one polarity to the opposite polarity to create doubled magnetic flux change therein. This increases the risk of short-through between supply rails in the driver circuits respectively driving each stator field coil, which short-through even if partial in nature causes undesirable heating within the driver circuits.

SUMMARY OF THE INVENTION

An alternative type of start-up commutation sequence has been developed by the inventors to increase starting torque in a three-phase brushless, sensorless DC motor without risk of any short-through between supply rails in the driver circuits respectively driving each stator field coil. This start-up commutation sequence will synchronize the rotation of the rotor during start-up with the rotating magnetic flux pattern generated by the stator field coil windings when the conventional step sequence is switched to during the run mode of operation, to obviate hunting problems with regard to rotor positioning during switch-over from a start-up mode to a run mode. This start-up commutation sequence is developed in accordance with an aspect of the invention by suppressing stator field coil excitation during alternate ones of the six consecutive commutation states that are established for each electrical cycle by the conventional step sequence used during operation of the DC motor in a run mode.

The start circuit that produces this start-up commutation sequence causes the DC motor to emit a chattering sound during start-up that supposedly resembles the noise made by a telegraph sounder, so such a start circuit is referred to as a "telegraph start circuit".

The fact that excitation is suppressed in all stator field coils during the alternative type of start-up commutation sequence facilitates the control of plural attempts to start. The timing of shut-down between successive attempts to start or to accelerate is controlled according to an aspect of the invention simply by adjusting the clocking rate of the circuitry used to generate the conventional step sequence.

More particularly, a telegraph-start circuit for a DC motor provided with three-phase stator field coils and respective driver circuitry for those field coils embodies the invention in various of its aspects. The telegraph-start circuit comprises a ring counter for generating the six-phase conventional step sequence; dual-mode commutation circuitry responsive to the six-phase conventional step sequence and to a mode control signal for supplying the six-phase conventional step sequence to the driver circuitry for the DC motor field coils during a run mode of operation and for supplying a modified step sequence during a start-up mode of operation to make a motor start at a high starting torque; a zero-crossing reference generator for generating a zero-crossing reference signal used in detecting whether the motor rotates in a correct direction or in a reverse direction; a phase selector for selecting the currently undriven stator field coil; a zero-crossing detector for detecting the actual zero-crossing of the back electromotive force supplied from the currently undriven stator field coil; a condition-of-rotation detector comparing that actual zero-crossing with the zero-crossing reference signal produced from the zero-crossing reference generator for detecting whether a correct-rotation condition, reverse-rotation condition or no-zero-crossing-occurrence condition obtains; an excitation current pulse width modulator for controlling the excitation current by increasing or decreasing the width of the excitation pulse for successful motor starting when the motor fails at the first time; a commutation-stop and power-Off time controller connected to the excitation current pulse width modulator, and used for stopping commutation by turning OFF a power line supplied to the motor and increasing or decreasing the power-OFF time interval for the successful motor starting when the motor fails at the first time; and a micro-processor serial port for connecting an external micro-processor and a circuit whereby the micro-processor can read/write all the operation states and control all the operations when a micro-processor is used.

In another aspect of the invention, the method for controlling the telegraph-start circuit includes the steps of initializing a variable N for checking number of failures of the motor starting, the pulse width T of the excitation current and the power-OFF time; commutating the output stage of the motor in the telegraph start mode during the initial starting of the motor; detecting whether the zero-crossing signal is detected; detecting whether the motor rotates in the reverse direction when the zero-crossing signal is detected; returning to the step for performing the commutating the output stage of the motor in the telegraph start mode after the commutating is stopped and the power is turned OFF when the motor rotates in the reverse direction; commutating the output stage of the motor in the CSS mode if the motor rotates in the correct direction; modulating the pulse width of the excitation current when the zero-crossing signal is not detected in the above step; modulating the power-OFF time; increasing the variable N for checking the number of failures of the motor starting; and ending the operation if the actual dynamic number of failures of the motor starting is same to the number of the previously set number of failures of the motor starting, and returning to the step for stopping the commutating after the power is turned OFF if the actual dynamic number of failures of the motor starting is less than the number of the previously set number of failures of the motor starting.

BRIEF DESCRIPTION OF THE DRAWING

FIGS. 4A–F are waveform charts of field coil currents in a conventional-step-sequence run mode and in a start mode for a telegraph-start circuit constructed in accordance with the invention, which waveform charts share a common time abscissa.

FIGS. 5A to 5M are waveform charts of a commutation signal in a conventional-step-sequence run mode and in a start mode in a telegraph-start circuit constructed in accordance with the invention, which waveform charts share a common time abscissa.

DESCRIPTION OF THE PREFERRED EMBODIMENT

Figure 1:
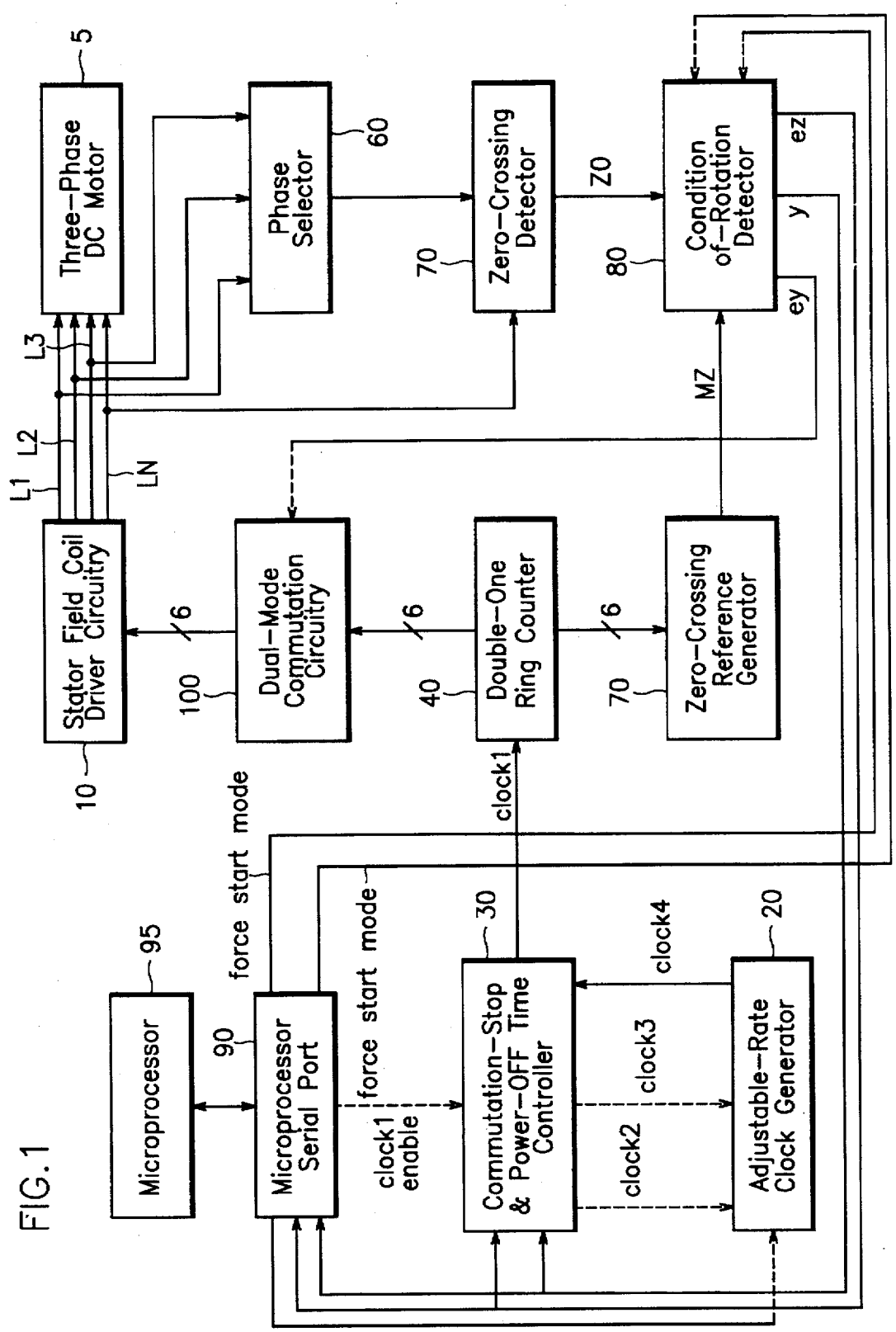
FIG. 1 is a block diagram illustrating a DC motor telegraph-start circuit constructed in accordance with the invention.

FIG. 1 shows a telegraph-start circuit for a sensorless brushless permanent-magnet DC motor 5. The DC motor 5 receives three-phase drive signals from three-phase stator field coil driver circuitry 10 via drive lines L1, L2 and L3 and supplies a common neutral voltage via neutral return line LN. An adjustable-rate clock generator 20 is used for generating a clock signal clock1 by rate dividing from a master clock signal clock0. A commutation-stop and power-off-time controller 30 directs the adjustment of the pulse frequency of the clock1 signal by the adjustable-rate clock generator 20 and selectively applies the clock1 signal to a ring counter 40 as a shift clock. That is, the adjustable-rate clock generator 20 and the commutation-stop and power-off-time controller 30 together comprise a shift clock generator 200 for the ring counter 40. The ring counter 40 is of a type which has six flip-flops in the ring and which circulates a pair of adjacent logic ONEs, rather than a single ONE, through the ring of flip flops. Responsive to the application of the clock signal, clock1, the ring counter 40 generates a six-phase clock signal supplied to a dual-mode commutation circuit 100. During a run mode of operation, the dual-mode commutation circuit 100 supplies this six-phase clock without modification to the three-phase stator field coil driver circuitry 10 for controlling its operation. During a start mode of operation, however, the dual-mode commutation circuit 100 modifies this six-phase clock to generate a three-phase clock supplied to the three-phase stator field coil driver circuitry 10 for controlling its operation.

A zero-crossing reference generator 50 generates a zero-crossing reference signal MZ based on the control signals as generated by the ring counter 40. A phase selector 60 responds to the control signals supplied by the ring counter 40 to select the back-EMF appearing between the neutral return line LN and the undriven one of the drive lines L1, L2 and L3 for application to a zero-crossing detector 70. The zero-crossing detector 70 provides an actual dynamic zero-crossing signal Z0 generated during the motor rotation, for comparison with the zero-crossing reference signal produced by the generator 50. This comparison is performed by a condition-of-rotation detector 80 that detects whether a correct-rotation condition, reverse-rotation condition or no-zero-crossing-occurrence condition obtains. The condition-of-rotation detector 80 transmits a mode control signal ey to the commutation circuit 100 for conditioning it to operate either in the run mode employing a conventional step sequence or in the start mode employing the modified step sequence according to an aspect of the invention. A micro-processor serial port 90 is provided for interfacing with an external micro-processor 95 and includes circuitry by which the microprocessor 95 can read/write all the operation states and control all the operations.

Figure 2:
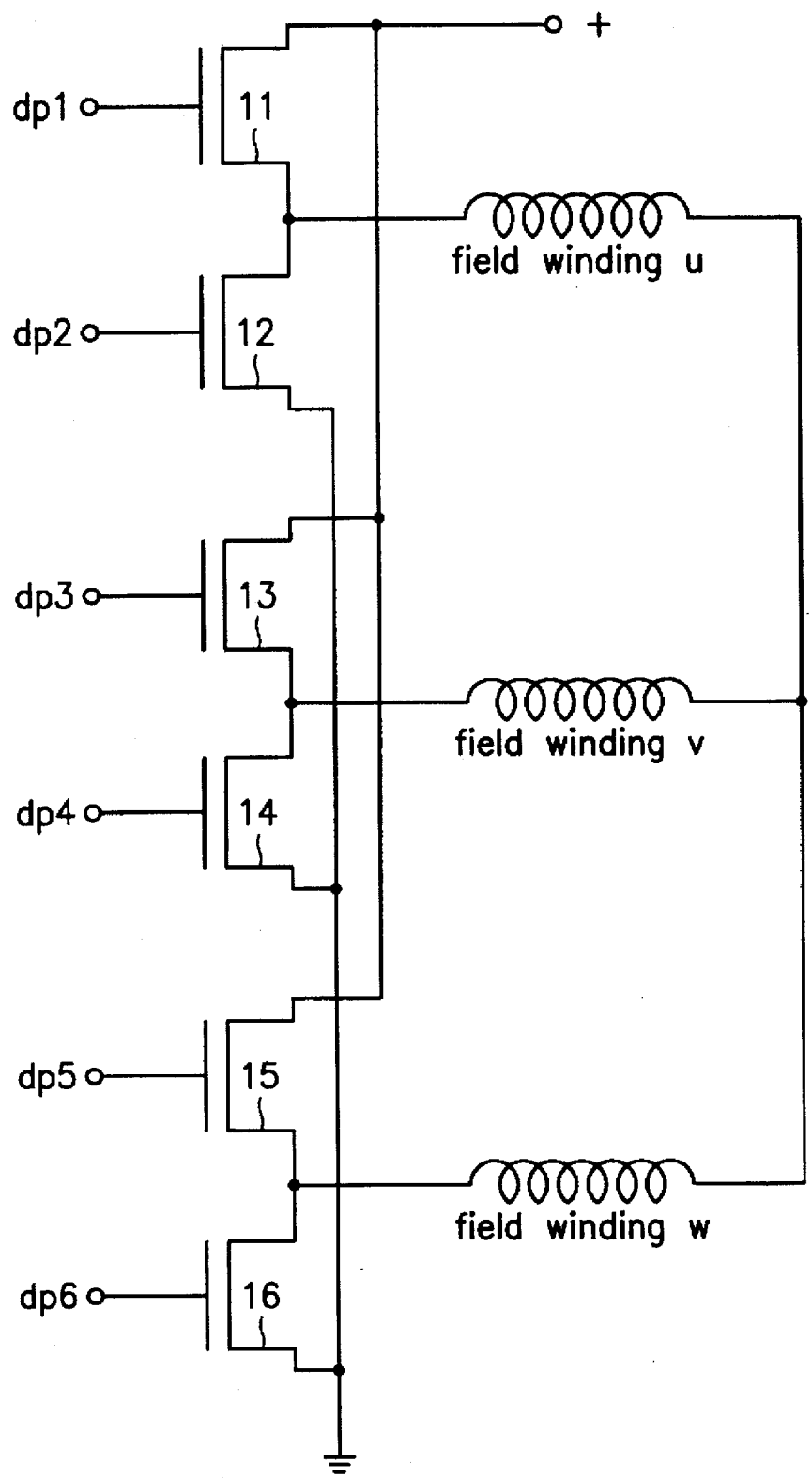
FIG. 2 is a circuit diagram of prior-art three-phase stator field coil driver circuitry that can be employed in the FIG. 1 telegraph-start circuit.

FIG. 2 illustrates representative three-phase stator field coil driver circuitry of type known in the prior art that can be used as the field coil driver circuitry 10 of FIG. 1 to apply three-phase excitation current to stator field coils u, v, w of the sensorless brushless permanent-magnet DC motor 5. FIG. 2 shows field coil driver circuitry employing insulated-gate field-effect transistors (IGFETs) of enhancement-mode n-channel type as switching devices because of the simplicity of applying the switching control signals to such switching devices, but as one skilled in the art of electronic circuit design will readily appreciate other types of field-effect transistors or bipolar transistors can be employed as switching devices. Indeed in certain environments such as those subject to high atomic radiation other types of switching devices, such as vacuum tubes, may be used.

The stator field coil windings u, v and w are in wye connection in FIG. 2, with their unconnected ends receiving three-phase drive signals via drives L1, L2 and L3 and with their connected ends supplying a common neutral voltage via neutral return line LN. N-channel IGFETs 11, 12, 13, 14, 15 and 16 receive signals dq1, dq2, dq3, dq4, dq5 and dq6 at their respective electrodes. The source electrodes of IGFETs 12, 14 and 16 connect to a reference ground potential down to which the signals dq1, dq2, dq3, dq4, dq5 and dq6 swing in their logic low conditions. The drain electrodes of IGFETs 11, 13 and 15 connect to a positive direct operating potential, and the signals dq1, dq2, dq3, dq4, dq5 and dq6 swing in their high conditions to a logic high potential more positive than the positive direct operating potential by a voltage somewhat higher than the source-to-gate potential the IGFETs 11, 12, 13, 14, 15 and 16 require for full conduction.

The source electrode of the IGFET 11 and the drain electrode of the IGFET 12 each connect to the drive line L1. When the signal dq1 is high to render the channel of IGFET 11 conductive, the drive line L1 is clamped to positive direct operating potential to drive current into the stator field coil u. When the signal dq2 is high to render the channel of IGFET 12 conductive, the drive line L1 is clamped to ground potential to receive current from the stator field coil u.

The source electrode of the IGFET 13 and the drain electrode of the IGFET 14 each connect to the drive line L2. When the signal dq3 is high to render the channel of IGFET 13 conductive, the drive line L2 is clamped to positive direct operating potential to drive current into the stator field coil v. When the signal dq4 is high to render the channel of IGFET 14 conductive, the drive line L2 is clamped to ground potential to receive current from the stator field coil v.

The source electrode of the IGFET 15 and the drain electrode of the IGFET 16 each connect to the drive line L3. When the signal dq5 is high to render the channel of IGFET 15 conductive, the drive line L3 is clamped to positive direct operating potential to drive current into the stator field coil w. When the signal dq6 is high to render the channel of IGFET 16 conductive, the drive line L3 is clamped to ground potential to receive current from the stator field coil w.

Figure 3:
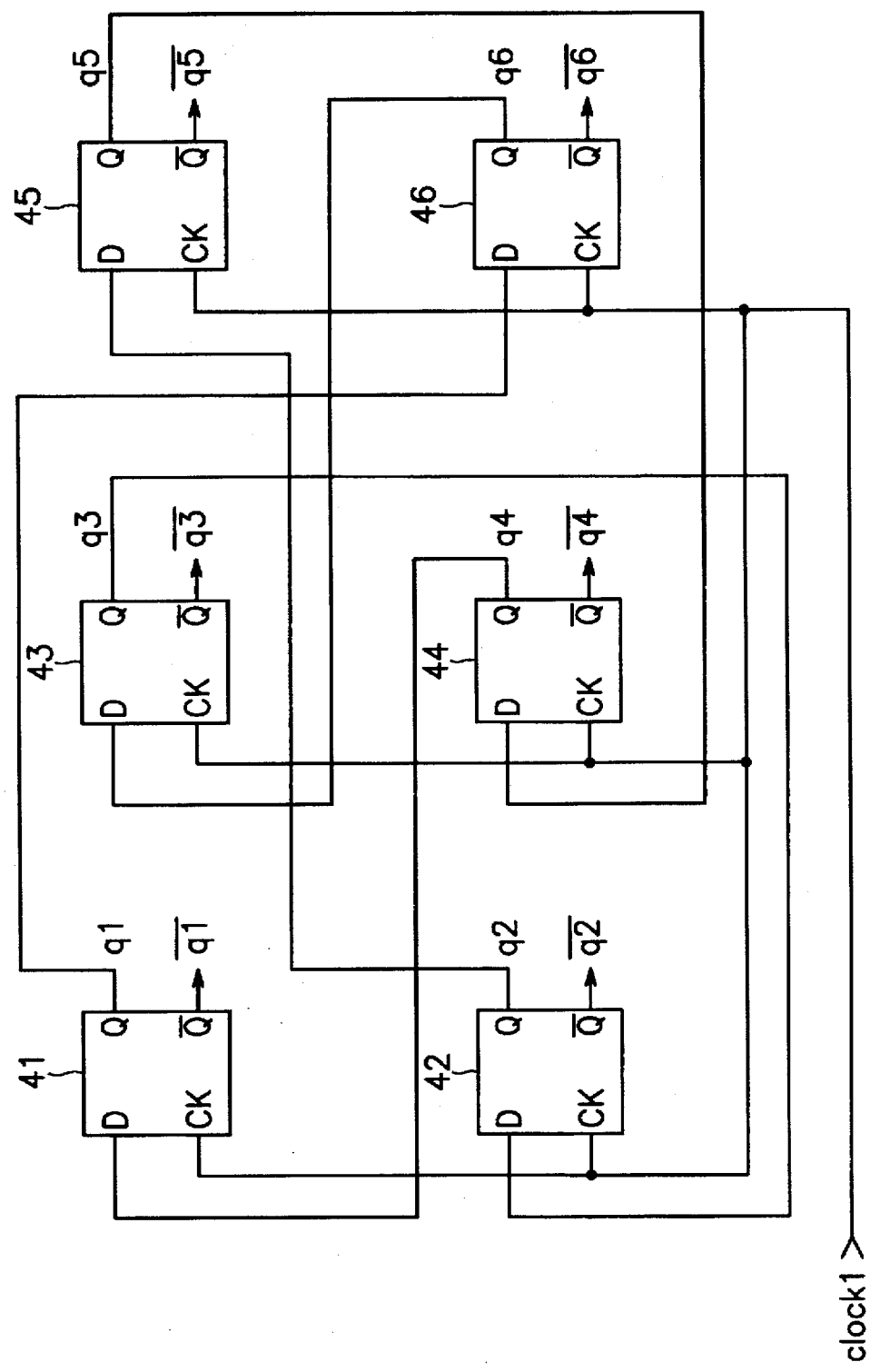
FIG. 3 is a detailed circuit diagram of a ring counter circuit that is used in the prior-art for generating the six-phase conventional step sequence (CSS) signals that control the switching operations of the three-phase stator field coil driver circuitry during the run mode of operation in the FIG. 1 telegraph-start circuit.

FIG. 3 shows a prior-art ring counter circuit used to generate conventional step sequence (CSS) stator field coil signals for a brushless three-phase DC motor. The ring counter 40 includes circuitry of this type to generate conventional step sequence (CSS) signals q1, q2, q3, q4, q5 and q6 for selective application to the stator field coil driver circuitry 10 as switching control signals dq1, dq2, dq3, dq4, dq5 and dq6, respectively, during the run mode of operation. The CSS signals q1, q2, q3, q4, q5 and q6 are supplied from the true outputs of data flip-flops 41, 42, 43, 44, 45 and 46, respectively, in the ring counter 40.

Table 1, following, tabulates the conditions of the switching control signals q1, q2, q3, q4, q5 and q6 cyclically applied to the upper-level and lower-level switching elements of the driver circuitry 10 in the conventional step sequence (CSS) mode.

TABLE 1

| y | ey | Upper Level | | | Lower Level | | | Driven coils |
|---|----|-----|-----|-----|-----|-----|-----|---|
|   |    | q1  | q3  | q5  | q2  | q4  | q6  |   |
| 1 | 0  | 1   | 0   | 0   | 0   | 1   | 0   | uv |
| 1 | 0  | 1   | 0   | 0   | 0   | 0   | 1   | uw |
| 1 | 0  | 0   | 1   | 0   | 0   | 0   | 1   | vw |
| 1 | 0  | 0   | 1   | 0   | 1   | 0   | 0   | vu |
| 1 | 0  | 0   | 0   | 1   | 1   | 0   | 0   | wu |
| 1 | 0  | 0   | 0   | 1   | 0   | 1   | 0   | wv |

In Table 1, y and ey are mode control signals the generation of which is described in detail further on in this specification. The commutation-stop and power-off time controller 30 withholds excitation current from the stator field coils when the mode control signal y is a logic ZERO. The mode signal ey being a logic ZERO is indicative of the FIG. 1 telegraph-start circuit being in a run mode of operation; and the mode signal ey being a logic ONE is indicative of that start circuit being in a start mode of operation. The signals q1, q3 and q5 are the true outputs of the data flip-flops 41, 43 and 45 used in the prior art to control the upper-level switching elements 11, 13 and 15 of the stator field coil driver stages that respectively selectively drive to positive direct voltage the connections L1, L2 and L3 to the ends of the windings u, v and w; and signals q2, q4 and q6 are the true outputs of the data flip-flops 42, 44 and 46 used in the prior art to control the lower-level switching elements 12, 14 and 16 of the stator field coil driver stages that respectively selectively drive to ground reference voltage the connections L1, L2 and L3 to the ends of the windings u, v and w. The commutation signals q1 to q6 of the CSS mode when applied to the switching elements 11 to 16 of the driver circuitry 10 causes cyclic application of excitation current to stator field coils uv, uw, vw, vu, wu and wv of the motor.

FIG. 3 does not show the circuitry for initially introducing the double-one sequence circulated in the ring counter 40. This initialization circuitry is conventional and includes multiplexers for selectively applying respective bits of the double-one sequence to the data inputs of the flip-flops 46, 45, 42, 41, 44 and 43 during initial powering up and for selectively applying the q1, q2, q3, q4, q5 and q6 true outputs of the flip-flops 41–46 to the data inputs of the flip-flops 46, 45, 42, 41, 44 and 43, respectively, following initial powering up.

FIGS. 4A–4C show the field coil currents Iu, Iv and Iw that flow in response to the conventional step sequence when operating in a CSS mode such as the run mode of the FIG. 1 telegraph-start circuit. At any given time only two of the stator field coils u, v and w are driven so as to have direct current flow through them, and the other stator field coil is undriven. Note in FIGS. 4A–4C that when excitation current is discontinued in the winding u to cause weakening magnetic flux, excitation current of similar polarity is applied to the winding w to cause strengthening magnetic flux therein maintaining a rotating field of substantially constant strength. When excitation current is discontinued in the winding w to cause weakening magnetic flux, excitation current is applied to the winding v to cause strengthening magnetic flux therein maintaining a continuing rotating field of substantially constant strength. And when excitation current is discontinued in the winding v to cause weakening magnetic flux, excitation current is applied to the winding u to cause strengthening magnetic flux therein maintaining a continuing rotating field of substantially constant strength.

Figure 5A:
Figure 5B:
Figure 5C:
Figure 5D:
Figure 5E:
Figure 5F:
Figure 5G:

FIG. 5A illustrates the waveform of the clock signal clock1 generated by the adjustable-rate clock generator 20 and selectively supplied to the ring counter 40 by the commutation-stop and power-off controller 30 of the telegraph-start circuit; and FIGS. 5B–5G illustrate the waveforms of the commutation signals q1 to q6 in the CSS mode plotted against the same time abscissa.

FIGS. 4D–4F show the field coil currents Iu, Iv and Iw that flow when the FIG. 1 telegraph-start circuit operates to provide high starting torque in accordance with an aspect of the invention. Table 2, following, tabulates the conditions of the switching control signals dq1, dq2, dq3, dq4, dq5 and dq6 cyclically applied to the upper-level and lower-level switching elements of the driver circuitry 10 in the start mode of the invention.

TABLE 2

| y | ey | Upper Level | | | Lower Level | | | Driven Coils |
|---|----|-----|-----|-----|-----|-----|-----|---|
|   |    | dq1 | dq3 | dq5 | dq2 | dq4 | dq6 |   |
| 1 | 1  | 1   | 0   | 0   | 0   | 1   | 0   | uv |
| 0 | 1  | 1   | 0   | 0   | 0   | 0   | 1   | none |
| 1 | 1  | 0   | 1   | 0   | 0   | 0   | 1   | vw |
| 0 | 1  | 0   | 1   | 0   | 1   | 0   | 0   | none |
| 1 | 1  | 0   | 0   | 1   | 1   | 0   | 0   | wu |
| 0 | 1  | 0   | 0   | 1   | 0   | 1   | 0   | none |

As indicated in Table 1, alternate ones of the CSS states are replaced by states in which none of the stator field coils are driven and excitation current is withheld, and this cycle is repeated, during starting operation of the DC motor 5 using the telegraph-start commutation sequence. As indicated in Table 1, excitation current does not flow through the winding of any of the field coils u, v and w of the DC motor 5 in these replacement states because the switching control signals dq1, dq2, dq3, dq4, dq5 and dq6 render all of the upper-level and lower-level switching elements of the driver circuitry 10 simultaneously non-conductive.

Note in FIGS. 4D–4F that there is simultaneous flux change establishing opposed fields in the windings u and v when excitation current is applied through them and, again, when excitation current is discontinued through them. Then, after a period in which no excitation current is applied, there is subsequently simultaneous flux change establishing opposed fields in the windings v and w when excitation current is applied through them and, again, when excitation current is discontinued through them. Then, after another period in which no excitation current is applied, there is subsequently simultaneous flux change establishing opposed fields in the windings w and u when excitation current is applied through them and, again, when excitation current is discontinued through them. The simultaneous flux changes establishing opposed fields exert higher starting torque on the motor rotor than the simultaneous flux changes maintaining continuing rotating fields in the conventional step sequence used in the prior art during initial start-up. The fact of there being opposed fields surrounding each successive pair of driven field coil windings forces rotor movement by repulsion as well as by attraction, lessening the possibility of dead points in the rotor rotation.

The simultaneous flux changes establishing opposed fields are a characteristic shared with prior-art double-drive starting methods. In the telegraph-start method of the present invention the simultaneous flux changes in opposed directions in the pairs of windings when excitation current is applied through them occur after periods of no field excitation and before periods of no field excitation. This eliminates the possibility of short-through between supply rails in the switching elements (e.g., IGFETS 11–16) applying excitation currents to the stator field coils, which is a vexatious problem in prior-art double-drive starting methods.

Also, since simultaneous flux changes in opposed directions occur in the pairs of windings after periods of no excitation, there is no magnetic saturation in the windings to reduce flux change and so adversely affect instantaneous starting torque. The portions of the commutation cycle in which excitation current is applied through a pair of windings are shorter in duration, which reduces the tendency towards magnetic saturation in the windings, so simultaneous flux changes in opposed directions when excitation current is discontinued through them better contribute to continuing starting torque.

The commutation stop intervals discontinue the application of excitation current to the stator field coils 50% of the time during start-up when field coil currents tend to be high since counter-EMFs have not built up to reduce field coil currents. This reduces the thermal dissipation required of the switching elements 11–16 used for driving the stator field coils u, v and w, which is a particularly important consideration when the switching elements 11–16 are included together with the other motor control circuitry within the confines of a monolithic integrated circuit.

FIGS. 5H to 5M are waveform charts of the novel commutation signal supplied during a telegraph-start starting mode of the FIG. 1 telegraph-start circuit and of the conventional step sequence commutation signal subsequently supplied during a running mode of the FIG. 1 telegraph-start circuit.

Figure 6:
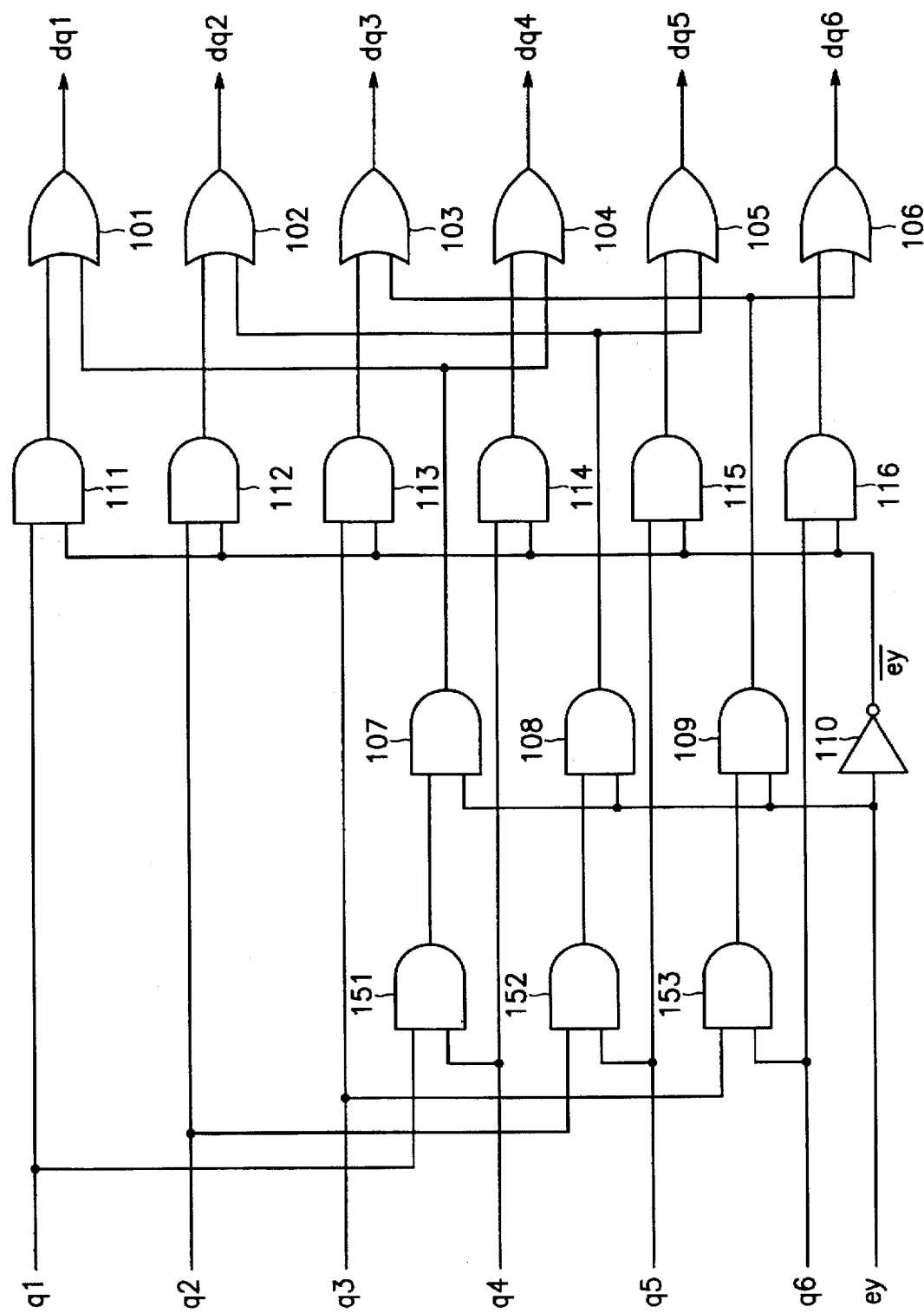
FIG. 6 is a detailed circuit diagram illustrating a dual-mode commutation circuit used for generating commutation signals in the FIG. 1 telegraph-start circuit responsive to output signal from a ring counter that circulates a double-one sequence.

FIG. 6 shows in detail a portion of a preferred embodiment of the dual-mode commutation circuit 100 of the FIG. 1 telegraph-start circuit, which circuit 100 is used to generate the switching control signals applied to the switch elements 11–16. These switching control signals are the gate potentials applied to the IGFETS 11–16 in the specific driver circuitry 10 shown in FIG. 2, for example. The dual-mode commutation circuit 100 is a combinatorial logic circuit which can selectively switch the commutation of the driver circuitry 10 from the novel step sequence employed during the start mode of operation (in accordance with an aspect of the invention) and the conventional step sequence employed during the run mode of operation. As will be described further on in this specification, with reference to FIG. 9, the condition-of-rotation detector 80 supplies a mode control signal ey to the dual-mode commutation circuit 100, which mode control signal ey is a logic ZERO during the run mode and is a logic ONE during the telegraph-start mode.

The dual-mode commutation circuit 100 includes two-input AND gates 151, 152 and 153. The AND gate 151 receives the commutation signals q1 and q4 from the ring counter 40 as first and second input signals, respectively, and generates an AND response to them during one of the three commutation states that are used during the run mode, but are each replaced by a no stator field coil drive condition during the telegraph-start mode. The AND gate 152 receives the commutation signals q3 and q6 from the ring counter 40 as first and second input signals, respectively, and generates an AND response to them during another of the three commutation states that are used during the run mode, but are each replaced by a no stator field coil drive condition during the telegraph-start mode. The AND gate 153 receives the commutation signals q5 and q2 from the ring counter 40 as first and second input signals, respectively, and generates an AND response to them during still another of the three commutation states that are used during the run mode, but are each replaced by a no stator field coil drive condition during the telegraph-start mode. As will be described further on, the AND gates 151, 152 and 153 can be elements shared in common with the zero-crossing reference generator 50.

The dual-mode commutation circuit 100 includes two-input OR gates 101, 102, 103, 104, 105 and 106 for respectively supplying the control signals dq1, dq2, dq3, dq4, dq5 and dq6 to the switching elements 11, 12, 13, 14, 15 and 16 of the driver circuitry 10. The dual-mode commutation circuit 100 also includes a two-input AND gate 107 supplying its response as the first input signals of the OR gates 101 and 104, a two-input AND gate 108 supplying its response as the first input signals of the OR gates 103 and 106, and a two-input AND gate 109 supplying its response as the first input signals of the OR gates 105 and 102. The AND gates 107, 108 and 109 receive the mode control signal ey as their first input signals. During the run mode the mode control signal ey being a logic ZERO conditions the respective responses of the AND gates 107, 108 and 109 each to be a respective logic ZERO, so the responses of the AND gates 107, 108 and 109 have no effect on the responses of the OR gates 101, 102, 103, 104, 105 and 106.

During the telegraph-start mode, the mode control signal ey being a logic ONE conditions the respective responses of the AND gates 107, 108 and 109 each to reproduce their second input signals, which are respectively supplied by the responses of the AND gates 151, 152 and 153. These signals control the responses of the OR gates 101, 102, 103, 104, 105 and 106 the second inputs of which, as will be subsequently explained, are all logic ZEROs during the telegraph-start mode. The responses of the OR gates 101 and 104 are simultaneously high when the Z1 response of the AND gate 151 is high during one of the three commutation states that is used both in the telegraph-start mode and in the run mode. The responses of the OR gates 103 and 106 are simultaneously high when the Z2 response of the AND gate 151 is high during another of the three commutation states that is used both in the telegraph-start mode and in the run mode. The responses of the OR gates 105 and 102 are simultaneously high when the Z3 response of the AND gate 153 is high during the other of the three commutation states that is used both in the telegraph-start mode and in the run mode.

A logic inverter or NOT gate 110 in the commutation circuit 100 complements the mode control signal ey to generate a complementary mode control signal $\overline{ey}$, which is a logic ONE during the run mode and is a logic ZERO during the telegraph-start mode. The dual-mode commutation circuit 100 further includes two-input AND gates 111, 112, 113, 114, 115 and 116, the respective responses of which supply the second input signals of the OR gates 101, 102, 103, 104, 105 and 106, respectively. The AND gates 111, 112, 113, 114, 115 and 116 receive the complementary mode control signal $\overline{ey}$ as their first input signals. During the telegraph-start mode the complementary mode control signal $\overline{ey}$ being a logic ZERO conditions the respective responses of the AND gates 111, 112, 113, 114, 115 and 116 each to be a respective logic ZERO, so the responses of the AND gates 111, 112, 113, 114, 115 and 116 have no effect on the responses of the OR gates 101, 102, 103, 104, 105 and 106. During the run mode the complementary mode control signal $\overline{ey}$ being a logic ONE conditions the AND gates 111, 112, 113, 114, 115 and 116 to reproduce in their respective responses their respective second input signals, which are the q1, q2, q3, q4, q5 and q6 CSS signals supplied from the ring counter 40. Since the second input signals supplied to the OR gates 101, 102, 103, 104, 105 and 106 are logic ZEROs during the run mode, the respective responses of the OR gates 101, 102, 103, 104, 105 and 106 reproduce in their respective responses dq1, dq2, dq3, dq4, dq5 and dq6 their respective first input signals, which respective first input signals respectively correspond with the q1, q2, q3, q4, q5 and q6 CSS signals supplied from the ring counter 40.

One skilled in the art of digital circuit design will understand that the combinatorial logic in the FIG. 6 commutation circuit 100 can be carried out in various equivalent ways in different telegraph-start circuits embodying the invention. For example, the AND gate 151 can receive q1 and $\overline{q6}$ as input signals, rather than q1 and q4; the AND gate 152 can receive $\overline{q4}$ and q5 as input signals, rather than q2 and q5; and the AND gate 153 can receive q3 and $\overline{q2}$ as input signals, rather than q3 and q6. As a further example, the two-input AND gates 151 and 107 can be replaced by a three-input AND gate; the two-input AND gates 152 and 108 can be replaced by a three-input AND gate; and the two-input AND gates 153 and 109 can be replaced by a three-input AND gate.

Figure 7:
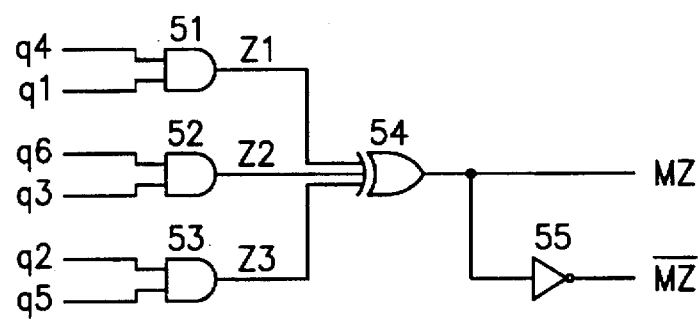
FIG. 7 is a detailed circuit diagram illustrating a zero-crossing reference generator that can be employed in the FIG. 1 telegraph-start circuit.

FIG. 7 shows the zero-crossing reference generator 50 in greater detail. When the commutation stop and power-off time controller 30 supplies the commutation clock signal clock1 to the FIG. 3 ring counter 40, a ring counter output signal having six states is generated. This ring counter output signal not only determines the excitation current status in the stator field coils u, v and w of the DC motor 5, but also is analyzed by the zero-crossing reference generator 50 to generate a reference zero-crossing signal of a back electromotive force (back-EMF). This reference zero-crossing signal is the zero-crossing signal that theoretically would be produced if the stator field coils had ideal transformer action amongst themselves.

To implement the generation of the model of such reference zero-crossing signal, the zero-crossing reference generator 50 includes two-input AND gates 51, 52 and 53 and further includes a three-input exclusive-OR gate 54. The AND gate 51 receives the commutation signals q1 and q4 from the ring counter 40 as first and second input signals, respectively, and ANDs them to generate a zero-crossing signal Z1. The AND gate 52 receives the commutation signals q3 and q6 from the ring counter 40 as first and second input signals, respectively, and ANDs them to generate a zero-crossing signal Z2. The AND gate 53 receives the commutation signals q5 and q2 from the ring counter 40 as first and second input signals, respectively, and ANDs them to generate a zero-crossing signal Z3. The exclusive-OR gate 54 receives zero-crossing signals Z1, Z2 and Z3 from the AND gates 51, 52 and 53 as its input signals and generates a zero-crossing signal MZ as an exclusive-OR logic response to those input signals. A logic inverter or NOT gate 55 responds to the zero-crossing signal MZ with its complement $\overline{MZ}$.

If the motor rotates in the correct direction, the zero-crossing reference signal MZ produced from the zero-crossing reference generator 50 leads in phase a real-time dynamic zero-crossing signal that is generated in the back-EMF of the motor coils because of a motor electrical constant L/R, where L is the inductance of a stator field coil winding and R is its resistance. However, if the motor rotates in the reverse direction, the zero-crossing reference signal MZ lags in phase the real-time back-EMF zero-crossing signal.

FIG. 7 depicts the zero-crossing reference generator 50 as including its own two-input AND gates 51, 52 and 53 to make clear what the generator 50 comprises. In practice, digital hardware is conserved if the zero-crossing reference generator 50 does not include its own two-input AND gates 51, 52 and 53, but instead shares elements with the dual-mode commutation circuit 100, using the responses of the AND gates 151, 152 and 153 as Z1, Z2 and Z3 signals.

Figure 8:
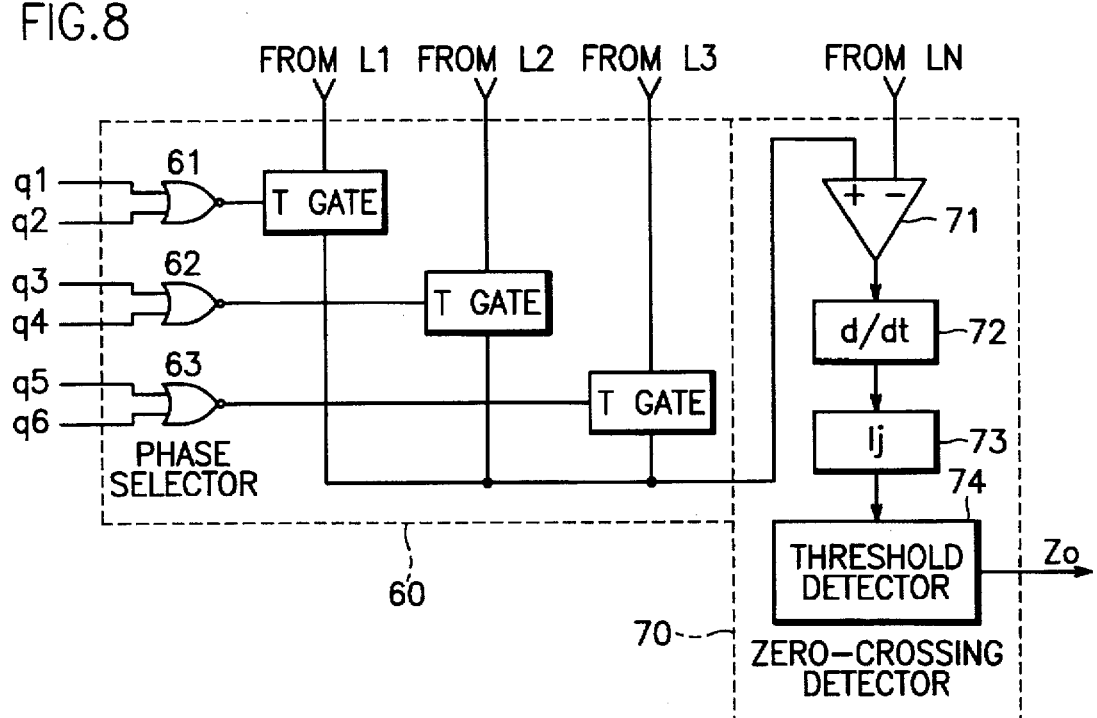
FIG. 8 is a detailed circuit diagram illustrating a phase selector and a zero-crossing detector that can be employed in the FIG. 1 telegraph-start circuit.

FIG. 8 shows in detail the construction of the phase selector 60 and the zero-crossing detector 70. The phase selector 60 includes three two-input NOR gates 61, 62 and 63 and further includes three transmission gates 64, 65 and 66. The NOR gate 61 responds to either of the commutation signals q1 and q2 from the ring counter 40 being high to indicate that coil u is not driven to conduct magnetic-field-exciting current, which indication is supplied to the transmission gate 64 for enabling its conduction to select the line L1 for supplying back-EMF to the zero-crossing detector 70. The NOR gate 62 responds to either of the commutation signals q3 and q4 from the ring counter 40 being high to indicate that coil v is not driven to conduct magnetic-field-exciting current, which indication is supplied to the transmission gate 65 for enabling its conduction to select the line L2 for supplying back-EMF to the zero-crossing detector 70. The NOR gate 63 responds to either of the commutation signals q5 and q6 from the ring counter 40 being high to indicate that coil w is not driven to conduct magnetic-field-exciting current, which indication is supplied to the transmission gate 66 for enabling its conduction to select the line L3 for supplying back-EMF to the zero-crossing detector 70.

The zero-crossing detector 70 of FIG. 8 includes a differential-input limiter amplifier 71, a differentiator 72, a full-wave rectifier or absolute-value circuit 73 and a threshold detector 74. The differential-input limiter amplifier 71 responds to the difference between the back-EMF on the selected one of the lines L1, L2 and L3 applied to its non-inverting input terminal and the neutral return potential on the line LN applied to its inverting input terminal, symmetrically clipping positive and negative excursions of its output signal to form a square wave response if the back-EMF is large enough. The differentiator 72 differentiates the output signal respective to time, responding to a square wave response to supply positive pulses responsive to positive-going transitions and negative pulses responsive to negative-going transitions. The full-wave rectifier or absolute-value circuit 73 converts the pulses to the same polarity for application to the threshold detector 74, which responds to the peaks of the pulses having amplitude greater than a prescribed threshold value by switching an output signal Z0 therefrom to logic ONE level and responds to the peaks of the pulses having lesser amplitude by switching the output signal Z0 therefrom to logic ZERO level. The prescribed threshold value is selected such that the output signal Z0 cannot be switched to logic ONE level by the response of the differentiator 72 to differential-input limiter amplifier 71 output signal that is too small for symmetrical clipping of its positive and negative excursions to form a square wave response. Zero-crossing detectors other than the particular zero-crossing detector 70 shown in FIG. 8 are known that exhibit similar function, providing logic ONE response to zero-crossings of back-EMFs of sufficient amplitude and otherwise providing logic ZERO response; and variants of the zero-crossing detector 70 and these other zero-crossing detectors are easily contrived by skilled electronic circuit designers.

Figure 9:
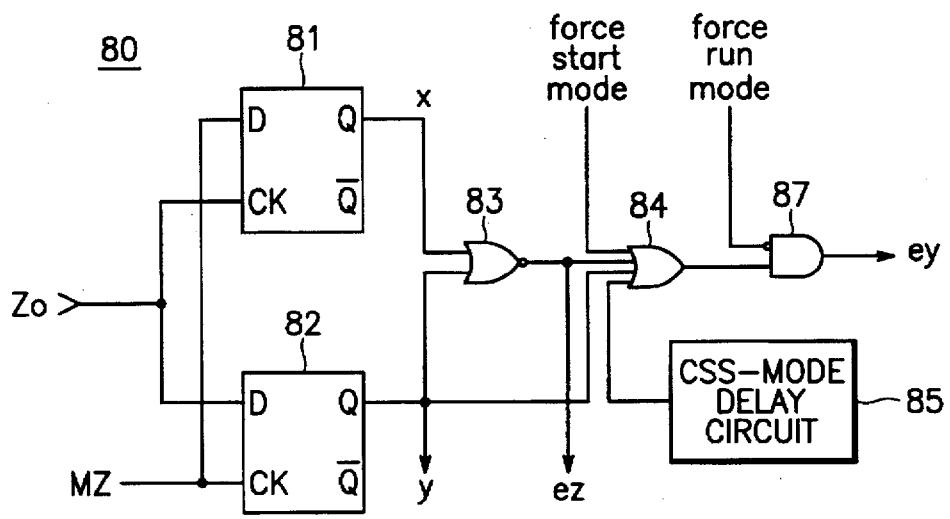
FIG. 9 is a detailed circuit, diagram illustrating a condition-of-rotation detector that can be employed in the FIG. 1 telegraph-start circuit.

FIG. 9 shows the condition-of-rotation detector 80 used to detect whether the signal MZ from the zero-crossing reference signal generator 50 leads or lags the real-time back-EMF zero-crossing signal Z0 from the zero-crossing detector 70. The condition-of-rotation detector 80 generates the mode control signals y and ey. A D-flip-flop 81 receives the zero-crossing reference signal MZ produced from the zero-crossing reference generator 50 of FIG. 6 as a respective data input D1 and a zero-crossing signal Z0 produced by the zero-crossing detector 70 during the motor rotation as a respective clock input CK1, compares the timing of the supplied zero-crossing reference signal MZ with that of the actual dynamic zero-crossing signal Z0, and produces a result signal x. A D-flip-flop 82 receives the zero-crossing reference signal MZ as a respective clock input CK2 and the zero-crossing signal Z0 as a respective data input D2, compares the timing of the supplied zero-crossing reference signal MZ with that of the actual dynamic zero-crossing signal Z0, and produces a result signal y.

The two D-flip-flops 81 and 82 can detect three different conditions encountered during operation of the DC motor 5, to wit: rotation of the motor 5 in the correct direction, reverse rotation of the motor 5, and the non-occurrence of the zero-crossing signal Z0 from the zero-crossing detector 70. The D-flip-flops 81 and 82 detect whether the motor rotates in the correct direction or in the reverse direction by comparing the timing of the back-EMF zero-crossing signal Z0 and the zero-crossing reference signal MZ. If the signal x from a true output terminal Q1 of the D-flip-flop 81 is a logic high, or ONE, it means that the motor 5 rotates in the correct direction. If the signal y from an output terminal Q2 of the D-flip-flop 82 is a logic high, or ONE, it means that the motor 5 rotates in the reverse direction. However, if the signals from the output terminals Q1 and Q2 in the D-flip-flops 81 and 82 are both a logic low, or ZERO, it means that the zero-crossing signal is not produced by the zero-crossing detector 70. If the rotor of the motor 5 does not rotate to change field magnetic flux conditions, the zero-crossing signal Z0 is not produced. The zero-crossing signal Z0 is produced by the zero-crossing detector 70 only when the motor rotates.

A truth table for the condition-of-rotation detector 80 is set forth in Table 3.

TABLE 3

| x | y | Results |
|---|---|---|
| 0 | 0 | Little or no rotation |
| 0 | 1 | Reverse rotation |
| 1 | 0 | Forward rotation |
| 1 | 1 | Invalid |

A two-input NOR gate 83 NORs the result signals x and y to produce a NOR response as its output signal, which NOR response is a ONE only when the zero-crossing signal is not detected. An OR gate 84 ORs at least the result signal y and the NOR gate 83 response to produce an OR response. The OR gate 84 response is a ONE, if the result signal y is a ONE indicative of one of the reverse rotation and invalid result conditions, or if the NOR gate 83 response is a ONE indicative of the zero-crossing signal not being detected. The OR gate 84 response can be a ZERO only when the result signal x is a ONE and the result signal y is a ZERO. The OR gate 84 receives a force start mode signal from the serial port 90 which normally is a ZERO, but can be made a ONE responsive to command from the external microprocessor 95. The OR gate 84 also receives output signal from a CSS-mode delay circuit 85 as further input signal in some start circuits embodying the invention. A two-input AND gate 86 receives the OR gate 84 response as first input signal and receives as second input signal the response of a logic inverter or NOT gate 87 to a force run mode signal supplied from the serial port 90. The force run mode signal normally is a ZERO, but can be made a ONE responsive to command from the external microprocessor 95. The AND gate 86 generates an AND response to its input signals which is supplied to the commutation circuit 100 as the mode control signal ey.

When the zero-crossing signal is not detected or when reverse rotation of the rotor of the DC motor 5 is detected, the condition-of-rotation detector 80 immediately generates a high mode control signal ey indicating that the start mode is to be employed. Additionally, responsive to the x signal being ZERO and the y signal being ONE, when reverse rotation of the rotor of the DC motor 5 is detected, the commutation-stop and power-OFF time controller 30 interrupts the application of excitation current to the stator field coils u, v, w of the motor 5.

Presuming that there is no failure associated with starting, operation in the start mode continues until some time after the zero-crossing signal is detected together with forward rotation of the rotor of the DC motor 5 being detected. The duration of continued operation in the start mode is determined by the time taken before the CSS-mode delay circuit 85 goes high to present a logic ONE as second input signal to the OR gate 84. The CSS-mode delay circuit 85 can take either of two general forms.

The CSS-mode delay circuit 85 can include a counter for counting the number of successive indications of forward rotation of the rotor of the DC motor 5, the counter being reset to zero count responsive to the NOR gate 83 response being ONE; a decoder for detecting when the count is less than a prescribed number to supply a ONE to the OR gate 84; and a gate for interrupting the further clocking of the counter in response to its count reaching the prescribed number, until such time as the counter is reset to zero count. Counting the number of successive indications of forward rotation of the rotor of the DC motor 5 need not be done in dedicated hardware within the condition-of-rotation detector 80, but can be programmed to be done in the external microprocessor 95 instead.

Alternatively, the CSS-mode delay circuit 85 can be of a type for determining a speed error signal for controlling the switching from the start mode to the CSS run mode, switching being deferred until the speed error signal as referred to desired speed is reduced to a predetermined value. The speed error signal can be determined by known methods proceeding from the back EMF detected in the output signal from the phase selector 60, for example. The back EMF and the direct voltage applied to the excited stator field coils can be sampled and digitized by an analog-to-digital converter if the procedure for controlling the switching from the start mode to the CSS run mode is implemented using the external microprocessor 95, but dedicated hardware approaches are also suitable.

As noted above, when reverse rotation of the rotor of the DC motor 5 is detected, the condition-of-rotation detector 80 immediately generates a mode control signal ey that is high, indicating that the start mode is to be employed; and the commutation-stop and power-OFF time controller 30 interrupts the application of excitation current to the stator field coils u, v, w of the motor 5. This interruption is accomplished in the FIG. 1 telegraph-start circuit without need for field coil switching elements other than the field coil switching elements 11–16 already used for commutation. Since the condition-of-rotation detector 80 has conditioned the dual-mode commutation circuit 100 for operation in the start mode, the ring counter 40 is reset to any one of the states in which the dual-mode commutation circuit 100 conditions the driver circuitry 10 not to apply exciting current to any of the stator field coils u, v, w of the motor 5; and then counting by the ring counter 40 is halted by withholding the clock signal clock1.

When reverse rotation is detected or when failure to start is detected, it is desirable to not to apply exciting current to any of the stator field coils u, v, w for varying periods of time. The lengths of these periods depend on the particular problem achieving proper motor rotation and on the power the stator field coil switching elements are called upon to dissipate because of improper motor rotation or failure to start. Longer periods of shut-off of exciting current to any of the stator field coils u, v, w are necessary where the field coil switching elements are subject to overheating. Where shut-off is accomplished by halting the ring counter 40 after its being reset, the clock signal clock1 can be withheld without using gating circuitry controlled by time-elapse counters. Instead, the rate at which the clock signal clock1 is supplied can be slowed so considerable time elapses before the ring counter 40 is clocked to a next state in which the dual-mode commutation circuit 100 conditions the driver circuitry 10 to apply exciting current to a selected pair of the stator field coils u, v, w. This procedure saves the need for separate time-elapse counters in the commutation-stop and power-OFF time controller 30 (or in the microprocessor 95) when an adjustable-rate clock generator 20 is available. An adjustable-rate clock generator 20 can already be used for supplying progressively higher rate clocking signal to the ring counter 40 as the DC motor 5 is brought up to final synchronous speed in a series of steps in which synchronous speed is progressively incremented.

Figure 10:
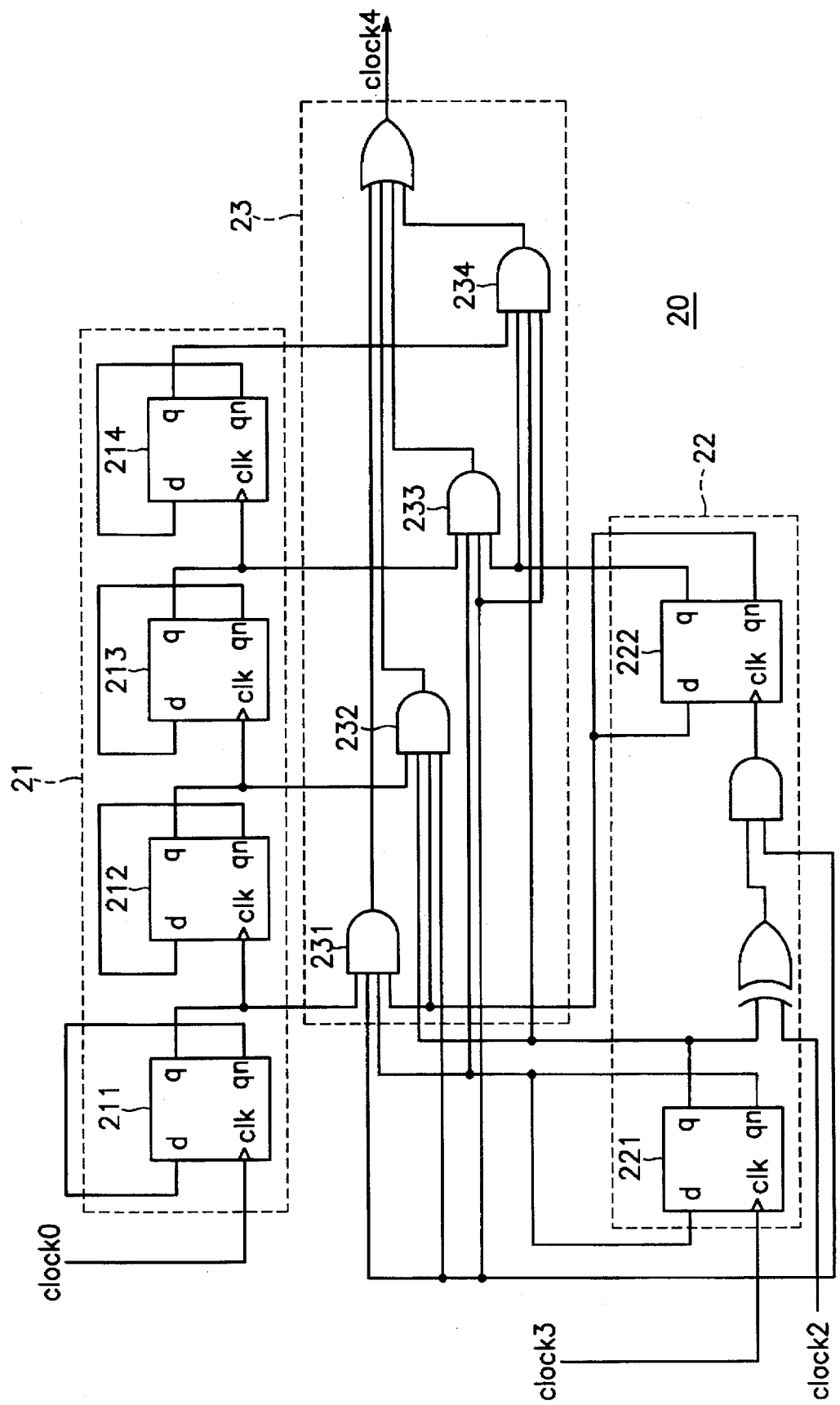
FIG. 10 is a detailed circuit diagram illustrating an adjustable-rate clock generator that can be employed in the FIG. 1 telegraph-start circuit for changing the pulse rate and pulse width of excitation currents applied to the stator field coils of the DC motor.

FIG. 10 shows a representative construction for the adjustable-rate clock generator 20. It includes a pulse frequency divider 21 having four D-flip-flops 211, 212, 213 and 214 receiving a system clock0 as a clock input and selectively dividing the pulse frequency of the supplied clock signal by a divisor 2, 4, 8 or 16; a two-stage binary counter 22 having two D-flip-flops 221 and 222 connected as an up/down counter for producing the divisor for the frequency divider 21 in response to clock signals clock2 and clock3; and a selection logic circuit 23 for increasing or decreasing the widths of the excitation current pulses and of the intervening intervals by selecting the pulse frequency of its clock4 output signal responsive to the divisor produced from the two-stage binary counter 22. The clock2 signal controls whether counting is incremental (up) or decremental (down) in the counter 22, and the clock3 signal pulses are the count input for the counter 22.

One of the divided frequencies from the frequency divider 21 is selected as the clock4 output signal by a selection logic circuit 23 controlled by a two-bit selection control signal produced from the two-stage binary counter 2:2. Since the two-stage binary counter 22 can count up or down, it can control each selector (231,232, 233 and 234) in the selection logic circuit 23 bi-directionally in terms of consecutive increment and decrement. The binary counter 22, the frequency divider 21 and the selection logic circuit 23 cooperate to adjust the rate of the clock1 signal pulses upward or downward.

Figure 11:
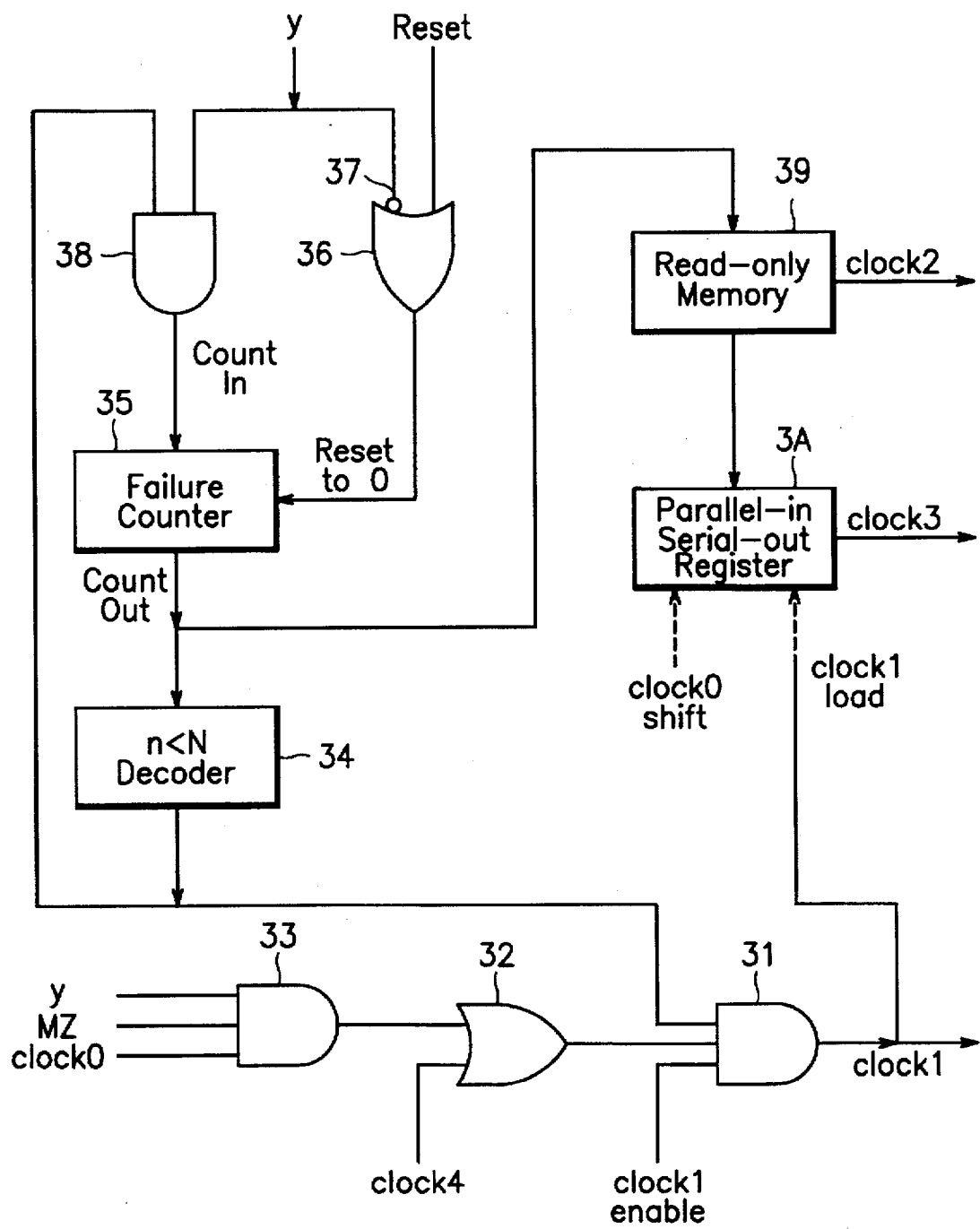
FIG. 11 is a detailed circuit diagram illustrating a commutation-stop and power-off-time controller 30 that can be employed in the FIG. 1 telegraph-start circuit.

FIG. 11 shows how the commutation-stop and power-OF time controller 30 can be constructed. A two-input OR gate 31 supplies the clock1 signal that clocks the ring counter 40 responsive to first and second input signals received from three-input AND gates 32 and 33, respectively. The AND gate 32 receives as its first input signal a clock1-enable signal from the micro-processor serial port 90, which clock1-enable signal is a logic ONE unless the external micro-processor 95 intervenes. The AND gate 32 receives as its second input signal another conditionally enabling signal from a decoder 34, which second input signal is a logic ONE as long as a number n of consecutive failures to successfully start the motor 5 as counted by a failure counter 35 has yet to reach a limit number N. The third input signal supplied to the AND gate 32 is the clock4 signal from the adjustable-rate clock generator 20, the pulse frequency of which clock4 signal is lowered when normal commutation is to be stopped, by means that will be described in detail further on in this specification. The clock1 signal that clocks the ring counter 40 is selected from the adjustable-rate clock4 signal from the adjustable-rate clock generator 20 by the AND gate 32, then, except for a supplemental shift pulse signal that is furnished by the AND gate 33 for inclusion in the clock1 signal The desire, when the result signal y from the condition-of-rotation detector 80 goes high indicating reverse rotation of the motor 5 rotor is detected, is that the ring counter 40 be immediately placed into a CSS state that will condition the dual-mode commutation circuit 100 to cause the driver circuitry 10 to withhold excitation current from the motor 5 field coils. The complement $\overline{MZ}$ of the zero-crossing reference signal MZ from the zero-crossing reference generator 50 being high indicates that the ring counter 40 is in a CSS state that is undesirable, because it conditions the dual-mode commutation circuit 100 to cause the driver circuitry 10 to apply excitation current to the motor 5 field coils. To remedy this problem the OR gate 31 immediately receives another clock pulse as its second input signal to clock the ring counter 40 to a succeeding CSS state, which is a commutation-stop state that will condition the dual-mode commutation circuit 100 to cause the driver circuitry 10 to withhold excitation current from the motor 5 field coils.

The AND gate 33 receives the result signal y from the condition-of-rotation detector 80 as its first input signal and the complement $\overline{MZ}$ of the zero-crossing reference signal MZ from the zero-crossing reference generator 50 as its second input signal. The AND gate 33 receives the system clock clock0 as its third input signal. If the state of the ring counter 40 is one in which the dual-mode commutation circuit 100 will undesirably cause excitation current to be supplied to the motor 5 field coils when normal commutation is to be stopped, as indicated by both the first and second input signals of the AND gate 33 being high, the AND gate 33 response will go high when the high-rate system clock signal clock0 goes high. This ONE applied as second input signal to the OR gate 31 causes its response to pulse once, briefly, advancing the count in the ring counter 40 to a commutation-stop state.

The detection of back rotation conditions occurs when the rotor is turning after start-up is initiated, sufficiently to generate back-EMF the zero-crossings of which can be detected, but the rotor position is not synchronized with the commutation conditions imposed by the dual-mode commutation circuit 100. By stopping commutation for a time, while the motor rotor continues to turn because of inertia, but slows, permits the rotor to reach a position where the reverse rotation indication provided by y being high is withdrawn. When the next attempt is made to restart commutation, the response of the AND gate 33 no longer pulses to immediately advance the count in the ring counter 40 to a commutation-stop state.

The failure counter 35 that counts the consecutive failures to start has its count reset to arithmetic zero by the response of a two-input OR gate 36 being a logic ONE. The NOR gate 83 response from the condition-of-rotation detector 80 is complemented by a logic inverter 37 and the resulting complement is applied as first input signal to the OR gate 36. The complementary response of the logic inverter 37 being a logic ONE indicates rotation of the motor 5 rotor is detected. Alternatively, reset of failure count to zero can be done by introducing a logic-ONE pulse into a normally logic-ZERO start signal that is applied to the second input of the OR gate 36. This logic-ONE pulse can be supplied from the external micro-processor 95 via the micro-processor serial port 90, can be supplied as part of a normal initial powering up sequence, or can be generated in response to a reset key being actuated by a human being.

The failure counter 35 receives as its count input the response of a two-input AND gate 38 receiving the clock1 signal as a first input signal and receiving the response of the NOR gate 83 in the condition-of-rotation detector 80 as a second input signal. The AND gate 38 reproduces pulses of the clock1 signal for counting by the failure counter 35 as long as the NOR response to the result signals x and y received as its second input signal indicates that zero-crossings of back-EMF are not detected. When the count output of the failure counter 35 reaches N, the decoder 34 output signal falls to logic ZERO, and the AND gate 31 is no longer conditioned to reproduce the clock4 signal as clock1 signal. There are no longer clock1 signal pulses for conditional application via the AND gate 38 to the failure counter 35 as count input, and the count output of the counter 35 remains at N until it is subsequently set to zero as previously described.

A read-only memory 39 receives, as its input address signal, the failure count from the counter 35. The ROM 39 can be loaded with information causing the commutation stop and power-off intervals to increase in length as the count n of consecutive failures to start increases. When starting is difficult, this will reduce thermal dissipation required from the switching elements 11–16 that apply excitation current to the stator field coils, thus forestalling overheating the switching elements 11–16.

At each addressed storage location the ROM 39 stores one clock3 signal bit for application to the adjustable-rate clock generator 20 via the agency of the micro-processor serial port 90, unless the external micro-processor 95 intervenes, and a plurality of clock2 signal bits in parallel-bit form. A parallel-in/serial-out register 3A responds to clock1 signal applied thereto as a load command to load in parallel the plurality of clock2 signal bits the ROM 36 furnishes in parallel-bit form. The PISO register 3A then responds to high-rate system clock0 signal applied thereto as a shift command to furnish the plurality of clock2 signal bits temporarily stored therein in serial-bit form, for application to the adjustable-rate clock generator 20 via the agency of the micro-processor serial port 90, unless the external micro-processor 95 intervenes.

The use of the up/down counter 22 in the adjustable-rate clock generator 20 is to facilitate controlling the selection logic circuit 23 by the external micro-processor 95 through the micro-processor serial port 90. In start circuits embodying the invention, but having no micro-processor serial port 90 through which an external micro-processor can exert control, there is no need to use serial-bit connections from the controller 30 to the adjustable-rate clock generator 20. The PISO register 3A in the controller 30 and the up/down counter 22 in the adjustable-rate clock generator 20 can be dispensed with; and the ROM 39 can be modified to store parallel-bit control signals for direct application to the AND gates 231–234 in the selection logic circuit 23.

Figure 12:
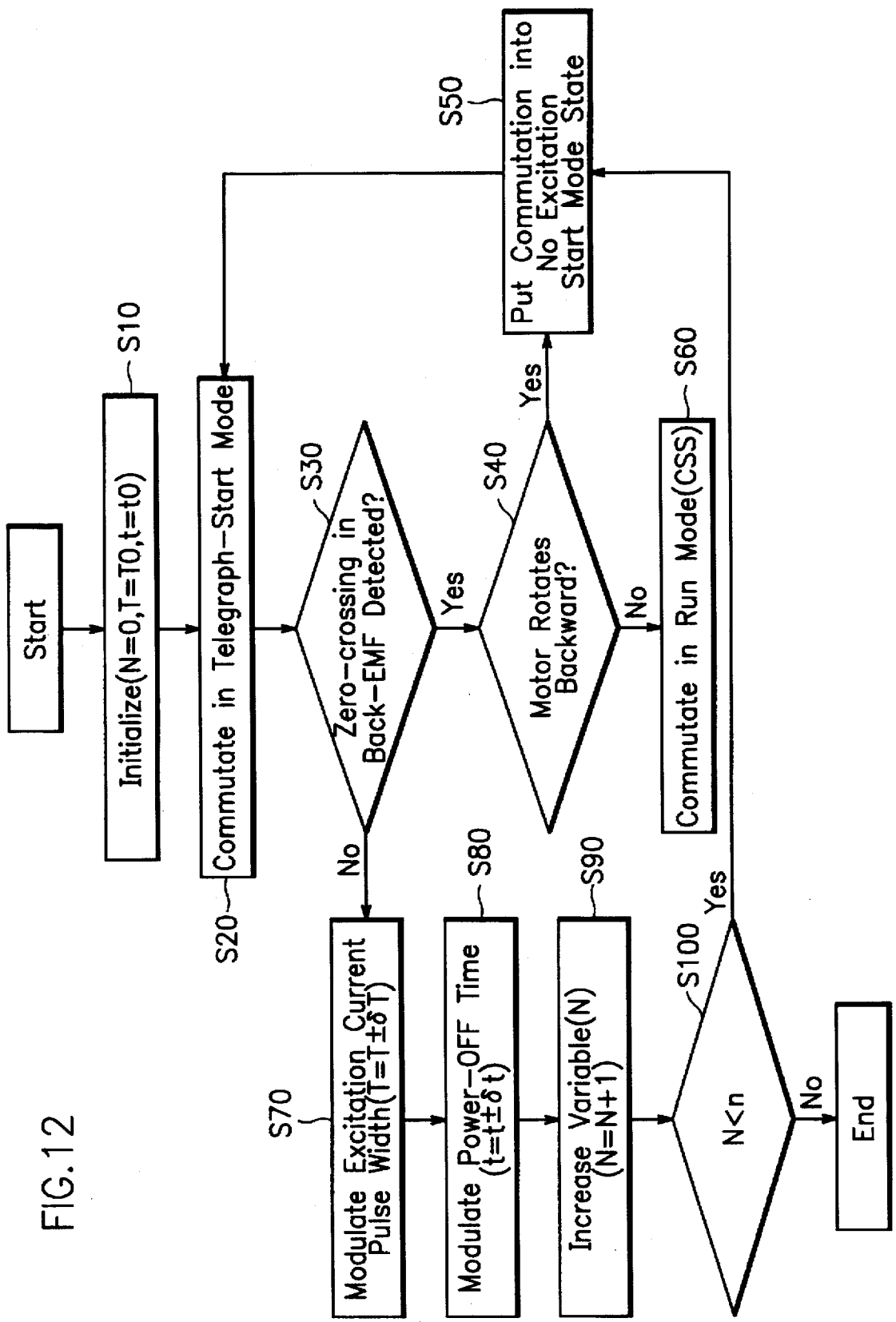
FIG. 12 is a flow chart illustrating the operational steps of a method for controlling a telegraph-start circuit in accordance with an aspect of the invention.

FIG. 12 is a flow chart illustrating the operational steps of a method for controlling a telegraph-start circuit in accordance with a preferred embodiment of the present invention. After start, a variable N indicating the count of failures of the motor starting, the number n of failures of the motor starting that will be counted before giving up trying to start the motor, the pulse width T of the excitation current and the power-OFF time t, are initialized (Step S10). The commutation is started in the telegraph-start mode during the initial starting of the motor (Step S20). It is determined whether zero-crossing in the back-EMF signal is detected (Step S30), and if so whether the motor rotates in the reverse direction when the zero-crossing signal is detected (Step S40). When the motor rotates in the reverse direction, if commutation is not already in one of the states which in the start mode results in no excitation current being supplied to the stator field coils, it is forced into such state and the operation returns back to the step for performing the commutation in the telegraph-start mode (Step S50). However, if the motor rotates in the correct direction, there is no such returning back; instead, commutation in the run mode using the conventional step sequence is enabled (Step S60).

When the zero-crossing signal is not detected in the above step (Step S30), the pulse width T of the excitation current is modulated (Step S70), the power-OFF time t is modulated (Step S80), and the variable N for checking the number of failures of the motor starting is incremented by one (Step S90).

Subsequently, the operation is ended if the actual dynamic number N of failures of the motor starting equals the number n of the previously set number of failures of the motor starting, and the power is turned OFF. If the count N of failures of the motor starting is less than the number n of the previously set number of failures of the motor starting that will be accepted before giving up the attempt to start the motor, the operation loops back to the step (Step S50) for stopping the commutating (Step S100).

Accordingly, the effect of the telegraph-start circuit according to the present invention lies in that it can produce the higher starting torque at the initial time and accurately detect the zero-crossing point during the periodical commutation-stop time and the power-OFF time to overcome disadvantages of a dead point, head-sticking and an insufficient initial starting torque in sensorless brushless permanent magnetic DC motor drive applications, and lower temperature of an integrated circuit by preventing the high starting current flowing into the motor output stage.

Figure 13:
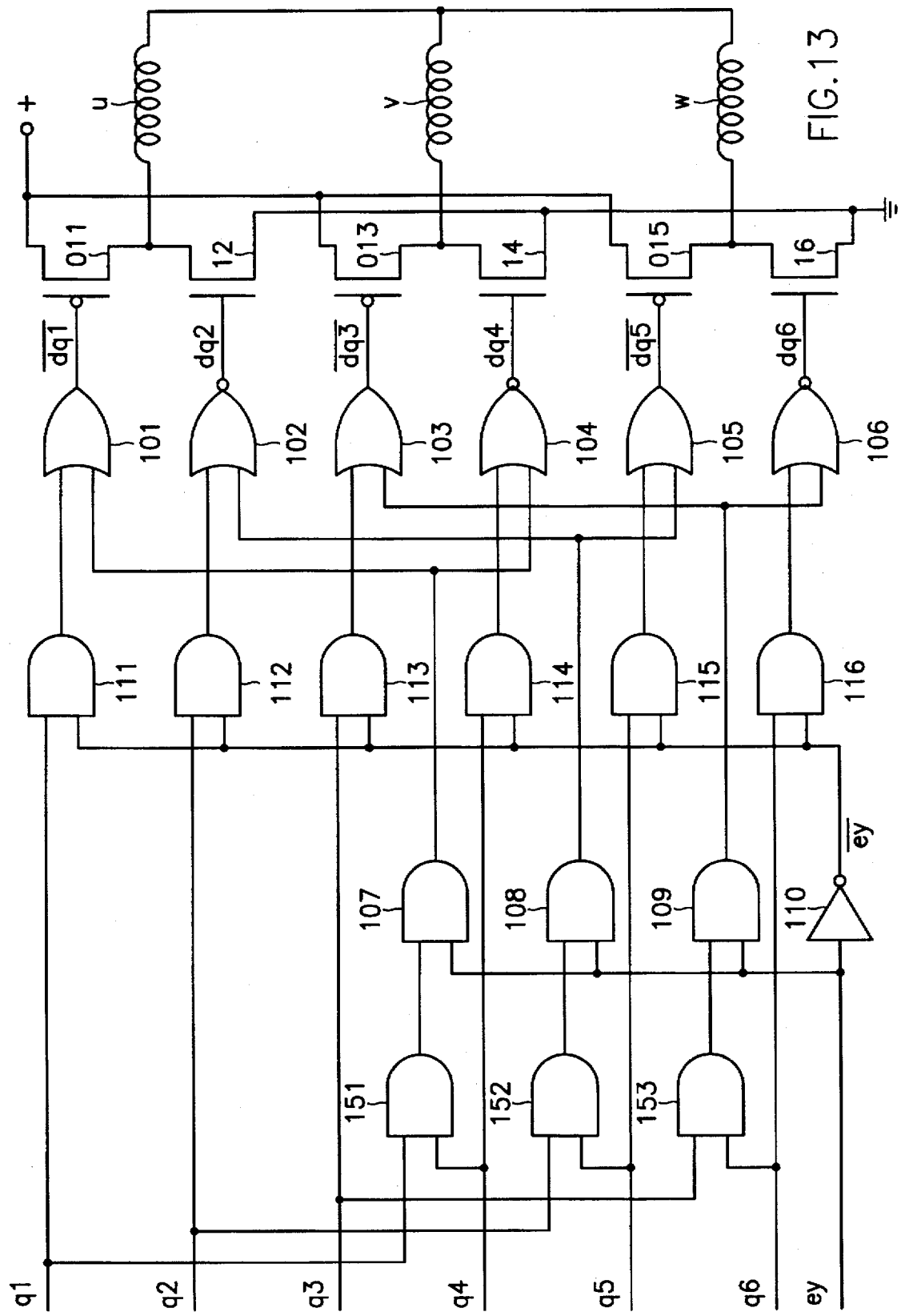
FIG. 13 is a circuit diagram showing modifications of the FIG. 2 three-phase stator field coil driver circuitry and FIG. 6 dual-mode commutation circuit in an alternative embodiment of the FIG. 1 telegraph-start circuit.

FIG. 13 shows three-phase stator field coil driver circuitry 010 that employs enhancement-mode IGFETs of complementary conductivity type, rather than enhancement-mode IGFETs of similar conductivity type, for driving the end of each of the stator field coils u, v and w and dual-mode commutation circuitry 0100 suitable for that driver circuitry. In an alternative embodiment of the FIG. 1 telegraph-start circuit the driver circuitry 010 and the dual-mode commutation circuitry 0100 replace the driver circuitry 10 and the dual-mode commutation circuitry 100 previously described.

In the dual-mode commutation circuitry 100 the OR gates 101, 103 and 105 have to exhibit responses with logic excursions more positive than the positive operating potential applied to the drains of the n-channel enhancement-mode IGFETs 11, 13 and 15 in order that their source electrodes can clamp to that positive operating potential when those IGFETs are rendered conductive. The source-to-drain potential of the IGFET 11, 13 or 15 should be as low as possible when it is switched into conduction, in order to minimize its power dissipation and consequent heating up.

Making the logic excursions of the responses of the OR gates 101, 103 and 105 more positive than the positive operating potential applied to the drains of the n-channel enhancement-mode IGFETs 11, 13 and 15 requires an additional operating voltage supply or requires a voltage boosting arrangement for the responses of the OR gates 101, 103 and 105. Both of these alternatives undesirably involve extra circuitry, but the desire to use switch transistors of one conductivity type may justify that extra circuitry.

The driver circuitry 010 is a modification of the driver circuitry 10 in which the n-channel enhancement-mode IGFETs 11, 13 and 15 are replaced by p-channel enhancement-mode IGFETs 011, 013 and 015, respectively, which can be completely switched despite their gate potentials being maintained within the range of operating potential for the driver circuitry. The p-channel enhancement-mode IGFETs 011, 013 and 015 switch using common-source-amplifier action, which involves signal inversion, rather than common-drain-amplifier action, which involves no signal inversion. Accordingly, dual-mode commutation circuitry 0100 for use with this driver circuitry 010 has the OR gates 101, 103 and 105 replaced by NOR gates 0101, 0103 and 0105, respectively, for providing gate signals $\overline{dqi1}$, $\overline{dq3}$ and $\overline{dq5}$ to the p-channel enhancement-mode IGFETs 011, 013 and 015, respectively.

Other embodiments of the invention will be apparent to the skilled in the art from consideration of the specification and practice of the invention disclosed herein. It is intended that the specification and examples be considered as exemplary only, with the true scope and spirit of the invention being indicated by the claims following this specification. With particular regard to claims 17 and 22, however, the replacement of all of the transistors of similar conductivity type used as the first, second, third, fourth, fifth and sixth switching elements with transistors of complementary type and the simultaneous replacement of the first, second, third, fourth, fifth and sixth two-input OR gates in the dual-mode commutation circuitry with respective NOR gates is to be considered an equivalent circuit which infringes the claim.

What is claimed is:

1. A start circuit for a DC motor with three-phase stator field coils and a permanently magnetized rotor, said start circuit comprising:

driver circuitry for cyclically applying exciting currents to two phases of said three-phase stator field coils and leaving one other phase of said three-phase stator field coils currently undriven;

phase selector circuitry for supplying back-electromotive-force generated in the phase of said three-phase stator field coils currently undriven;

a zero-crossing detector for detecting zero-crossings of said back-electromotive-force supplied by said phase selector circuitry to generate indications of actual zero-crossings;

a shift clock generator for generating shift clock pulse signals, the timing of which shift clock pulse signals is controlled responsive to said indications of actual zero-crossings;

a six-stage ring counter responsive to said shift clock pulse signals for circulating a pair of consecutive logic ONES and thus generating a six-phase clocking signal, each cycle of which has six commutation states; and dual-mode commutation circuitry, for applying each alternate consecutive one of said six commutation states of said six-phase clocking signal to said driver circuitry during both a start-up mode of operation and a run mode of operation, and for selectively applying each intervening one of said six commutation states of said six-phase clocking signal to said driver circuitry during said run mode of operation but not during said start-up mode of operation.

2. A start circuit for a DC motor as set forth in claim 1, further comprising:

a zero-crossing reference generator responsive to said six-phase clocking signal for generating a zero-crossing reference signal which is indicative of when said each alternate consecutive one of said six commutation states of said six-phase clocking signal occur, thus to generate said zero-crossing reference signal; and a condition-of-rotation detector, for generating a first indication that indicates when the rotor of said motor does not rotate sufficiently fast to generate significant back electromotive force, for generating a second indication that indicates when the rotor of said motor rotates in an incorrect reverse direction sufficiently fast to generate significant back electromotive force, and for generating a third indication when the rotor of said DC motor rotates either in a reverse direction or does not rotate sufficiently fast to generate significant back electromotive force, said first indication being generated in response to said indications of actual zero-crossings being of less than a prescribed amplitude, said second indication being generated by comparing the occurrences of said indications of actual zero-crossings with said zero-crossing reference signal, said third indication being generated in response to said first and second indications, and said third indication being supplied to said dual-mode commutation circuitry for conditioning said dual-mode commutation circuitry to operate in said start-up mode.

3. A start circuit for a DC motor as set forth in claim 2, wherein said shift clock generator comprises:

an adjustable-rate clock generator for supplying an adjustable-rate clock signal; and a commutation-stop and power-OFF time controller for controlling the pulse frequency of said adjustable-rate clock signal supplied from said adjustable-rate clock generator to supply said shift clock signal, said time controller being responsive to each said first indication from said condition-of-rotation detector for adjusting the pulse frequency of said shift clock signal to a value for run mode operation, said time controller being responsive to said second indication from said condition-of-rotation detector for applying a supplementary shift clock pulse to said six-stage ring counter if said six-phase clocking signal be in any of said alternate consecutive ones of said six commutation states, and said time controller being responsive to each said third indication from said condition-of-rotation detector for reducing the pulse frequency of said shift clock signal.

4. A start circuit for a DC motor as set forth in claim 3, wherein said commutation-stop and power-OFF time controller comprises:

a first binary counter clocked by said shift clock pulse signals, used to generate a failure count that controls the pulse frequency of said adjustable-rate clock signal supplied from said adjustable-rate clock generator, connected for counting until a final failure count value is reached consecutive said first indications generated by said condition-of-rotation detector, and reset to an initial failure count value by a reset command or by lack of said first indication when clocked by a shift clock pulse signal;

a first decoder receiving said failure count and detecting whether said failure count has yet to reach said final failure count value to generate a first decoder output signal; and a gate receiving said adjustable-rate clock signal supplied from said adjustable-rate clock generator and supplying shift clock pulse signals in selective response to said adjustable-rate clock signal only when said first decoder output signal indicates said failure count has yet to reach said final failure count value.

5. A start circuit for a DC motor as set forth in claim 4, wherein said adjustable-rate clock generator comprises:

a second binary counter having a plurality p in number of stages for counting system clock pulses supplied at a prescribed system clock pulse frequency, functioning as a pulse frequency divider to provide a plurality of clock signals having pulse frequencies that are respective submultiples of said prescribed system clock pulse frequency; and a pulse frequency selector for selecting one of said submultiples of said prescribed system clock pulse frequency as said adjustable-rate clock signal.

6. A start circuit for a DC motor as set forth in claim 5, wherein said adjustablerate clock generator further comprises a third binary counter having a plurality at least $\log_2 p$ in number of stages arranged as an up/down counter, the count therefrom controlling said selecting by said pulse frequency selector; wherein said commutation-stop and power-OFF time controller further comprises means responsive to said failure count for determining, at least conditionally, the count from said third binary counter.

7. A start circuit for a DC motor as set forth in claim 6, in combination with a microprocessor, wherein the count from said third binary counter can be determined by said microprocessor.

8. A start circuit for a DC motor as set forth in claim 2; wherein said six-stage ring counter comprises first, sixth, third, second, fifth and fourth flip-flops connected in named order in ring connection for respectively supplying first, sixth, third, second, fifth and fourth consecutive phases of said six-phase clocking signal; and wherein said driver circuitry comprises:

a neutral return line from interconnected first ends of a first-phase stator field coil winding, a second-phase stator field coil winding and a third-phase stator field coil winding of said three-phase stator field coils in a wye connection;

a first drive line connected to a second end opposite the first end of said first-phase stator field coil winding;

a second drive line connected to a second end opposite the first end of said second-phase stator field coil winding;

a third drive line connected to a second end opposite the first end of said third-phase stator field coil winding;

a first switching element for applying drive current of a first polarity to said first drive line when rendered conductive by said dual-mode commutation circuitry, responsive to said first phase of said six-phase clocking signal during a run mode of operation, and responsive to the portion of said first phase of said six-phase clocking signal overlapped by said fourth phase thereof during a start mode of operation;

a second switching element for applying drive current of a second polarity opposite said first polarity to said first drive line when rendered conductive by said dual-mode commutation circuitry, responsive to said second phase of said six-phase clocking signal during a run mode of operation, and responsive to the portion of said second phase of said six-phase clocking signal overlapped by said fifth phase thereof during a start mode of operation;

a third switching element for applying drive current of said first polarity to said second drive line when rendered conductive by said dual-mode commutation circuitry, responsive to said third phase of said six-phase clocking signal during a run mode of operation, and responsive to the portion of said third phase of said six-phase clocking signal overlapped by said sixth phase thereof during a start mode of operation;

a fourth switching element for applying drive current of said second polarity to said second drive line when rendered conductive by said dual-mode commutation circuitry, responsive to said fourth phase of said six-phase clocking signal during a run mode of operation, and responsive to the portion of said fourth phase of said six-phase clocking signal overlapped by said first phase thereof during a start mode of operation;

a fifth switching element for applying drive current of said first polarity to said third drive line when rendered conductive by said dual-mode commutation circuitry, responsive to said fifth phase of said six-phase clocking signal during a run mode of operation, and responsive to the portion of said fifth phase of said six-phase clocking signal overlapped by said second phase thereof during a start mode of operation; and a sixth switching element for applying drive current of said second polarity to said third drive line when rendered conductive by said dual-mode commutation circuitry, responsive to said sixth phase of said six-phase clocking signal during a run mode of operation, and responsive to the portion of said sixth phase of said six-phase clocking signal overlapped by said third phase thereof during a start mode of operation.

9. A start circuit for a DC motor as set forth in claim 8, wherein said zero-crossing reference generator comprises:

a three-input exclusive-OR gate for supplying, as its output response, said zero-crossing reference signal, which has a first condition during each said alternate consecutive one of said six commutation states of said six-phase clocking signal, and which has a second condition during each said intervening one of said six commutation states of said six-phase clocking signal; and first, second and third two-input AND gates connected for supplying their respective responses to respective inputs of said three-input exclusive-OR gate, said first AND gate receiving said first and fourth phases of said six-phase clocking signal at respective ones of its inputs, said second AND gate receiving said third and sixth phases of said six-phase clocking signal at respective ones of its inputs, and said third AND gate receiving said fifth and second phases of said six-phase clocking signal at respective ones of its inputs.

10. A start circuit for a DC motor as set forth in claim 9, wherein said phase selector circuitry comprises:

a first two-input NOR gate receiving said first and second phases of said six-phase clocking signal at respective ones of its inputs and generating a first NOR response thereto;

a second two-input NOR gate receiving said third and fourth phases of said six-phase clocking signal at respective ones of its inputs and generating a second NOR response thereto;

a third two-input NOR gate receiving said fifth and sixth phases of said six-phase clocking signal at respective ones of its inputs and generating a third NOR response thereto; and an analog selector for supplying said zero-crossing detector the back-electromotive-force between said neutral return line and said first drive line responsive to said first NOR response being a logic ONE, for supplying said zero-crossing detector the back-electromotive-force between said neutral return line and said second drive line responsive to said second NOR response being a logic ONE, and for supplying said zero-crossing detector the back-electromotive-force between said neutral return line and said third drive line responsive to said third NOR response being a logic ONE.

11. A start circuit for a DC motor as set forth in claim 10, wherein said condition-of-rotation detector comprises:

a first data flip-flop receiving the response of said zero-crossing detector as a respective clock input signal, receiving said zero-crossing reference signal as a respective data input signal, and supplying a true response that is logic ONE when and only the rotor of said motor rotates in the correct direction to generate back electromotive force causing response from said zero-crossing detector; and a second data flip-flop receiving said zero-crossing reference signal as a respective clock input signal, receiving the response of said zero-crossing detector as a respective data input signal, and supplying a true response that is logic ONE when and only the rotor of said motor rotates in the reverse direction to generate back electromotive force causing response from said zero-crossing detector.

12. A start circuit for a DC motor as set forth in claim 11, wherein said condition-of-rotation detector further comprises:

a fourth two-input NOR gate connected for receiving said true responses of said first and second data flip-flops as respective inputs and generating a fourth NOR response thereto; and an OR gate connected for receiving said fourth NOR response and said true response of said second data flip-flop as respective inputs and generating an OR response supplied, at least conditionally, to said dual-mode commutation circuitry, said OR response indicating a start-up mode of operation when a logic ONE and a run mode of operation when a logic ZERO.

13. A start circuit for a DC motor as set forth in claim 12, in combination with a microprocessor that is capable of applying a force start mode command as further input signal to said OR gate and that is capable of supplying a force run mode command, said condition-of-rotation detector further comprising:

a logic inverter for receiving said force run mode command and providing a complementary response;

a fourth two-input AND gate receptive of said complementary response at a first input and of said OR response at a second input, for conditionally supplying said OR response to said dual-mode commutation circuitry.

14. A start circuit for a DC motor as set forth in claim 9, wherein said condition-of-rotation detector comprises:

a first data flip-flop receiving the response of said zero-crossing detector as a respective clock input signal, receiving said zero-crossing reference signal as a respective data input signal, and supplying a true response that is logic ONE when and only the rotor of said motor rotates in the correct direction to generate back electromotive force causing response from said zero-crossing detector; and a second data flip-flop receiving said zero-crossing reference signal as a respective clock input signal, receiving the response of said zero-crossing detector as a respective data input signal, and supplying a true response that is logic ONE when and only the rotor of said motor rotates in the reverse direction to generate back electromotive force causing response from said zero-crossing detector.

15. A start circuit for a DC motor as set forth in claim 14, wherein said condition-of-rotation detector further comprises:

a first two-input NOR gate connected for receiving said true responses of said first and second data flip-flops as respective inputs and generating a first NOR response thereto; and an OR gate connected for receiving said first NOR response and said true response of said second data flip-flop as respective inputs and generating an OR response supplied, at least conditionally, to said dual-mode commutation circuitry, said OR response indicating a start-up mode of operation when a logic ONE and a run mode of operation when a logic ZERO.

16. A start circuit for a DC motor as set forth in claim 14, including means for driving a mode control signal and a complementary mode control signal from said third indication from said condition-of-rotation detector.

17. A start circuit for a DC motor as set forth in claim 16; wherein said first, second, third, fourth, fifth and sixth switching elements are transistors of similar conductivity type; and wherein said dual-mode commutation circuitry comprises, in addition to said first, second and third two-input AND gates:

first, second, third, fourth, fifth and sixth two-input OR gates, the respective responses of which respectively control conduction of said first, second, third, fourth, fifth and sixth switching elements;

a fourth two-input AND gate connected for receiving said mode control signal and the response of said first AND gate as respective input signals and for supplying an output signal to the first inputs of said first and fourth OR gates;

a fifth two-input AND gate connected for receiving said mode control signal and the response of said second AND gate as respective input signals and for supplying an output signal to the first inputs of said third and sixth OR gates;

a sixth two-input AND gate connected for receiving said mode control signal and the response of said third AND gate as respective input signals and for supplying an output signal to the first inputs of said fifth and second OR gates;

a seventh two-input AND gate connected for receiving a complementary mode control signal and said first phase of said six-phase clocking signal as respective input signals and for supplying an output signal to the second input of said first OR gate;

an eighth two-input AND gate connected for receiving said complementary mode control signal and said second phase of said six-phase clocking signal as respective input signals and for supplying an output signal to the second input of said second OR gate;

a ninth two-input AND gate connected for receiving said complementary mode control signal and said third phase of said six-phase clocking signal as respective input signals and for supplying an output signal to the second input of said third OR gate;

a tenth two-input AND gate connected for receiving said complementary mode control signal and said fourth phase of said six-phase clocking signal as respective input signals and for supplying an output signal to the second input of said fourth OR gate;

an eleventh two-input AND gate connected for receiving said complementary mode control signal and said fifth phase of said six-phase clocking signal as respective input signals and for supplying an output signal to the second input of said fifth OR gate; and a twelfth two-input AND gate connected for receiving said complementary mode control signal and said sixth phase of said six-phase clocking signal as respective input signals and for supplying an output signal to the second input of said sixth OR gate.

18. A start circuit for a DC motor as set forth in claim 17, wherein said condition-of-rotation detector further comprises:

a first two-input NOR gate connected for receiving said true responses of said first and second data flip-flops as respective inputs and generating a first NOR response thereto; and a seventh OR gate connected for receiving said first NOR response and said true response of said second data flip-flop as respective inputs and generating an OR response supplied, at least conditionally, to said dual-mode commutation circuitry as said mode control signal, said mode control signal indicating a start-up mode of operation when a logic ONE and a run mode of operation when a logic ZERO.

19. A start circuit for a DC motor as set forth in claim 16; wherein said first, third and fifth switching elements are transistors of a first conductivity type and said second, fourth and sixth switching elements are transistors of a second conductivity type complementary to said first conductivity type; and wherein said dual-mode commutation circuitry comprises, in addition to said first, second and third two-input AND gates:

first, second and third two-input NOR gates, the respective responses of which respectively control conduction of said first, third and fifth switching elements;

first, second and third two-input OR gates, the respective responses of which respectively control conduction of said second, fourth and sixth switching elements;

a fourth two-input AND gate connected for receiving said mode control signal and the response of said first AND gate as respective input signals and for supplying an output signal to the first inputs of said first NOR gate and said second OR gate;

a fifth two-input AND gate connected for receiving said mode control signal and the response of said second AND gate as respective input signals and for supplying an output signal to the first inputs of said second NOR gate and said third OR gates;

a sixth two-input AND gate connected for receiving said mode control signal and the response of said third AND gate as respective input signals and for supplying an output signal to the first inputs of said third NOR gate and said first OR gate;

a seventh two-input AND gate connected for receiving a complementary mode control signal and said first phase of said six-phase clocking signal as respective input signals and for supplying an output signal to the second input of said first NOR gate;

an eighth two-input AND gate connected for receiving said complementary mode control signal and said second phase of said six-phase clocking signal as respective input signals and for supplying an output signal to the second input of said first OR gate;

a ninth two-input AND gate connected for receiving said complementary mode control signal and said third phase of said six-phase clocking signal as respective input signals and for supplying an output signal to the second input of said second NOR gate;

a tenth two-input AND gate connected for receiving said complementary mode control signal and said fourth phase of said six-phase clocking signal as respective input signals and for supplying an output signal to the second input of said second OR gate;

an eleventh two-input AND gate connected for receiving said complementary mode control signal and said fifth phase of said six-phase clocking signal as respective input signals and for supplying an output signal to the second input of said third NOR gate; and a twelfth two-input AND gate connected for receiving said complementary mode control signal and said sixth phase of said six-phase clocking signal as respective input signals and for supplying an output signal to the second input of said third OR gate.

20. A start circuit for a DC motor as set forth in claim 19, wherein said condition-of-rotation detector further comprises:

a fourth two-input NOR gate connected for receiving said true responses of said first and second data flip-flops as respective inputs and generating a NOR response thereto; and a fourth OR gate connected for receiving the NOR response of said fourth NOR gate and said true response of said second data flip-flop as respective inputs and generating a OR response supplied, at least conditionally, to said dual-mode commutation circuitry as said mode control signal, said mode control signal indicating a start-up mode of operation when a logic ONE and a run mode of operation when a logic ZERO.

21. A start circuit for a DC motor as set forth in claim 1; wherein said six-stage ring counter comprises first, sixth, third, second, fifth and fourth flip-flops connected in named order in ring connection for respectively supplying first, sixth, third, second, fifth and fourth consecutive phases of said six-phase clocking signal; and wherein said driver circuitry comprises:

a neutral return line from interconnected first ends of a first-phase stator field coil winding, a second-phase stator field coil winding and a third-phase stator field coil winding of said three-phase stator field coils in a wye connection;

a first drive line connected to a second end opposite the first end of said first-phase stator field coil winding;

a second drive line connected to a second end opposite the first end of said second-phase stator field coil winding;

a third drive line connected to a second end opposite the first end of said third-phase stator field coil winding;

a first switching element for applying drive current of a first polarity to said first drive line when rendered conductive by said dual-mode commutation circuitry, responsive to said first phase of said six-phase clocking signal during a run mode of operation, and responsive to the portion of said first phase of said six-phase clocking signal overlapped by said fourth phase thereof during a start mode of operation;

a second switching element for applying drive current of a second polarity opposite said first polarity to said first drive line when rendered conductive by said dual-mode commutation circuitry, responsive to said second phase of said six-phase clocking signal during a run mode of operation, and responsive to the portion of said second phase of said six-phase clocking signal overlapped by said fifth phase thereof during a start mode of operation;

a third switching element for applying drive current of said first polarity to said second drive line when rendered conductive by said dual-mode commutation circuitry, responsive to said third phase of said six-phase clocking signal during a run mode of operation, and responsive to the portion of said third phase of said six-phase clocking signal overlapped by said sixth phase thereof during a start mode of operation;

a fourth switching element for applying drive current of said second polarity to said second drive line when rendered conductive by said dual-mode commutation circuitry, responsive to said fourth phase of said six-phase clocking signal during a run mode of operation, and responsive to the portion of said fourth phase of said six-phase clocking signal overlapped by said first phase thereof during a start mode of operation;

a fifth switching element for applying drive current of said first polarity to said third drive line when rendered conductive by said dual-mode commutation circuitry, responsive to said fifth phase of said six-phase clocking signal during a run mode of operation, and responsive to the portion of said fifth phase of said six-phase clocking signal overlapped by said second phase thereof during a start mode of operation; and a sixth switching element for applying drive current of said second polarity to said third drive line when rendered conductive by said dual-mode commutation circuitry, responsive to said sixth phase of said six-phase clocking signal during a run mode of operation, and responsive to the portion of said sixth phase of said six-phase clocking signal overlapped by said third phase thereof during a start mode of operation.

22. A start circuit for a DC motor as set forth in claim 21; wherein said first, second, third, fourth, fifth and sixth switching elements are transistors of similar conductivity type; wherein said dual-mode commutation circuitry is provided with a mode control signal and a complementary mode control signal; and wherein said dual-mode commutation circuitry comprises:

first, second, third, fourth, fifth and sixth two-input OR gates, the respective responses of which respectively control conduction of said first, second, third, fourth, fifth and sixth switching elements;

a first two-input AND gate connected for supplying a logic ONE response to said first and fourth phases of said six-phase clocking signal both being logic ONEs and for otherwise supplying a logic ZERO response;

a second two-input AND gate connected for supplying a logic ONE response to said third and sixth phases of said six-phase clocking signal both being logic ONEs and for otherwise supplying a logic ZERO response;

a third two-input AND gate connected for supply a logic ONE response to the said fifth and second phases of said six-phase clocking signal both being logic ONEs and for otherwise supplying a logic ZERO response;

a fourth two-input AND gate connected for receiving said mode control signal and the response of said first AND gate as respective input signals and for supplying an output signal to the first inputs of said first and fourth OR gates;

a fifth two-input AND gate connected for receiving said mode control signal and the response of said second AND gate as respective input signals and for supplying an output signal to the first inputs of said third and sixth OR gates;

a sixth two-input AND gate connected for receiving said mode control signal and the response of said third AND gate as respective input signals and for supplying an output signal to the first inputs of said fifth and second OR gates;

a seventh two-input AND gate connected for receiving a complementary mode control signal and said first phase of said six-phase clocking signal as respective input signals and for supplying an output signal to the second input of said first OR gate;

an eighth two-input AND gate connected for receiving said complementary mode control signal and said second phase of said six-phase clocking signal as respective input signals and for supplying an output signal to the second input of said second OR gate;

a ninth two-input AND gate connected for receiving said complementary mode control signal and said third phase of said six-phase clocking signal as respective input signals and for supplying an output signal to the second input of said third OR gate;

a tenth two-input AND gate connected for receiving said complementary mode control signal and said fourth phase of said six-phase clocking signal as respective input signals and for supplying an output signal to the second input of said fourth OR gate;

an eleventh two-input AND gate connected for receiving said complementary mode control signal and said fifth phase of said six-phase clocking signal as respective input signals and for supplying an output signal to the second input of said fifth OR gate; and a twelfth two-input AND gate connected for receiving said complementary mode control signal and said sixth phase of said six-phase clocking signal as respective input signals and for supplying an output signal to the second input of said sixth OR gate.

23. A start circuit for a DC motor as set forth in claim 21; wherein said first, third and fifth switching elements are transistors of a first conductivity type and said second, fourth and sixth switching elements are transistors of a second conductivity type complementary to said first conductivity type; and wherein said dual-mode commutation circuitry comprises:

first, second and third two-input NOR gates, the respective responses of which respectively control conduction of said first, third and fifth switching elements;

first, second and third two-input OR gates, the respective responses of which respectively control conduction of said second, fourth and sixth switching elements;

a first two-input AND gate connected for supplying a logic ONE response to said first and fourth phases of said six-phase clocking signal both being logic ONEs and for otherwise supplying a logic ZERO response;

a second two-input AND gate connected for supplying a logic ONE response to said third and sixth phases of said six-phase clocking signal both being logic ONEs and for otherwise supplying a logic ZERO response;

a third two-input AND gate connected for supply a logic ONE response to the said fifth and second phases of said six-phase clocking signal both being logic ONEs and for otherwise supplying a logic ZERO response;

a fourth two-input AND gate connected for receiving said mode control signal and the response of said first AND gate as respective input signals and for supplying an output signal to the first inputs of said first NOR gate and said second OR gate;

a fifth two-input AND gate connected for receiving said mode control signal and the response of said second AND gate as respective input signals and for supplying an output signal to the first inputs of said second NOR gate and said third OR gates;

a sixth two-input AND gate connected for receiving said mode control signal and the response of said third AND gate as respective input signals and for supplying an output signal to the first inputs of said third NOR gate and said first OR gate;

a seventh two-input AND gate connected for receiving a complementary mode control signal and said first phase of said six-phase clocking signal as respective input signals and for supplying an output signal to the second input of said first NOR gate;

an eighth two-input AND gate connected for receiving said complementary mode control signal and said second phase of said six-phase clocking signal as respective input signals and for supplying an output signal to the second input of said first OR gate;

a ninth two-input AND gate connected for receiving said complementary mode control signal and said third phase of said six-phase clocking signal as respective input signals and for supplying an output signal to the second input of said second NOR gate;

a tenth two-input AND gate connected for receiving said complementary mode control signal and said fourth phase of said six-phase clocking signal as respective input signals and for supplying an output signal to the second input of said second OR gate;

an eleventh two-input AND gate connected for receiving said complementary mode control signal and said fifth phase of said six-phase clocking signal as respective input signals and for supplying an output signal to the second input of said third NOR gate; and a twelfth two-input AND gate connected for receiving said complementary mode control signal and said sixth phase of said six-phase clocking signal as respective input signals and for supplying an output signal to the second input of said third OR gate.

24. A method for controlling a start circuit for a DC motor, which start circuit is of a telegraph-start type, comprising the steps of:

initializing a variable for checking number of failures of the motor starting, the pulse width of the excitation current and the power-OFF time;

commutating the output stage of the motor in a telegraph start mode during an initial starting of the motor;

detecting whether a zero-crossing signal is detected;

detecting whether the motor rotates in the reverse direction when the zero-crossing signal is detected;

returning to the step for performing the commutating the output stage of the motor in the telegraph start mode after commutating is stopped and power is turned OFF when the motor rotates in a reverse direction;

commutating the output stage of the motor in a conventional-step-sequence mode if the motor rotates in the correct direction;

modulating the pulse width of the excitation current when zero-crossing signal is not detected in the above step;

modulating power-OFF time;

increasing the variable for checking the number of failures of the motor starting;

returning to step for stopping the commutating after the power is turned OFF if actual dynamic number of failures of the motor starting is less than the number of the previously set number of failures of the motor starting; and ending the operation if the actual dynamic number of failures of the motor starting is same as the number of the previously set number of failures of the motor starting.

* * * * *